(12) United States Patent
Tatsumi

(10) Patent No.: US 12,541,106 B2
(45) Date of Patent: Feb. 3, 2026

(54) LOUVER, HEAD MOUNTED DISPLAY, AND OPTICAL APPARATUS

(71) Applicant: CANON KABUSHIKI KAISHA, Tokyo (JP)

(72) Inventor: Shumpei Tatsumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 17/958,479

(22) Filed: Oct. 3, 2022

(65) Prior Publication Data

US 2023/0117929 A1    Apr. 20, 2023

(30) Foreign Application Priority Data

Oct. 18, 2021 (JP) .................. 2021-170246

(51) Int. Cl.
*G02B 27/01*        (2006.01)
*G02B 27/09*        (2006.01)

(52) U.S. Cl.
CPC ..... *G02B 27/0172* (2013.01); *G02B 27/0938* (2013.01)

(58) Field of Classification Search
CPC ............ G02B 27/0172; G02B 27/0938; G02B 2207/123; G02B 27/0018; G02B 2027/0118; G02B 27/01; G02B 27/09; G02B 27/00; G02B 5/1857; G02B 2027/0178; G03F 7/0005; G03F 7/0002; G03F 7/0037; G03F 7/40; G03F 7/7045
USPC ....... 359/237, 883, 428, 332, 245, 615, 558, 359/566, 831, 837
See application file for complete search history.

(56) References Cited

U.S. PATENT DOCUMENTS 6,744,558 B2 *   6/2004   Tanaka ................. G03B 21/625
                                                             359/460
2011/0128470 A1   6/2011   Yorita et al.
2019/0386250 A1   12/2019  Suzuki
(Continued)

FOREIGN PATENT DOCUMENTS

JP    H11-095160 A    4/1999
JP    2006-201611 A   8/2006
JP    2009-186879 A   8/2009
(Continued)

OTHER PUBLICATIONS

English Translation of JP2009186879 (Aug. 20, 2009)(Year: 2009).*

*Primary Examiner* — Thomas K Pham
*Assistant Examiner* — Kuei-Jen L Edenfield
(74) *Attorney, Agent, or Firm* — Venable LLP

(57) ABSTRACT

A louver includes a first member made of transparent material, a second member made of transparent material, and a plurality of light blocking portions made of light blocking material. The first member and the second member are configured to join with each other. A first main surface of each of the plurality of light blocking portions is in contact with the first member and a second main surface of each of the light blocking portions is in contact with the second member. The first member includes convex portions, each of the convex portions being configured to project from the first main surface of one of the plurality of light blocking portions toward a center line of the louver. One end surface of each of the plurality of light blocking portions in a direction along the center line is in contact with one of the convex portions.

18 Claims, 18 Drawing Sheets

(56) References Cited

U.S. PATENT DOCUMENTS

2020/0264431 A1\* 8/2020 Von Spiegel ........ G02B 3/0056
2022/0299774 A1 9/2022 Tatsumi et al.

FOREIGN PATENT DOCUMENTS

| JP | 2009186879 | \* | 8/2009 |
| JP | 2009-216778 A | | 9/2009 |
| JP | 2011-075947 A | | 4/2011 |
| JP | 2015-059959 A | | 3/2015 |
| JP | 2021-033019 A | | 3/2021 |
| JP | 2021-107851 A | | 7/2021 |

\* cited by examiner (PRIOR ART)

(PRIOR ART)

LOUVER, HEAD MOUNTED DISPLAY, AND OPTICAL APPARATUS

BACKGROUND OF THE INVENTION

Field of the Invention

The present invention relates to a louver used in an optical apparatus, such as a head mounted display, and a method of manufacturing the louver.

Description of the Related Art

In a variety of fields including the virtual reality, head mounted displays are used. The head mounted display has more advantageous features than those of the direct-view flat-panel display and the projection display. For example, the head mounted display can display an image viewed by a user in a desired direction, and superimpose an image on an image of the outside world that is seen from a position of a user.

As schematically illustrated in FIG. 17, a head mounted display includes a display panel 21 that displays an image, and an optical element 22 that condenses display light IMG from the display panel 21 so that the display light IMG is focused on or near a user's eye 24. Note that FIG. 17 is a conceptual schematic diagram. For example, an optical-path changing element, such as a mirror or a PBS, may be disposed between the display panel 21 and the user's eye 24; and the display panel 21 and the optical element 22 may be disposed at different positions. The optical element 22 may be a transmissive optical element such as a convex lens, a reflective optical element such as a concave mirror, or a plurality of elements in which the transmissive optical element and the reflective optical element are combined with each other.

By the way, for improving the visibility of users, it is proposed that a louver be disposed in the housing of a head mounted display.

For example, Japanese Patent Application Publication No. H11-95160 proposes a configuration in which a louver that has a light blocking effect is disposed on a combiner of a head mounted display that combines external light coming from the front and display light coming from a displayed image. However, Japanese Patent Application Publication No. H11-95160 fails to disclose a specific structure of the louver having the light blocking effect and a specific method of manufacturing the louver.

Japanese Patent Application Publication No. 2009-186879 describes a method of manufacturing a louver of a house window used for controlling the daylight, although the louver is not intended to be used for a head mounted display. Specifically, Japanese Patent Application Publication No. 2009-186879 describes a method of forming a light receiving surface of a louver by spraying convex portions formed on a transparent base layer of the louver, with black quick-drying paint by using a spray nozzle.

For providing an easy-to-see image to a user in a head mounted display, it is necessary to deliver the display light from the display panel to a user's eyes with less loss and disturbance and prevent the external light and the stray light, produced in the head mounted display, from reaching a user's eyes as much as possible.

Although Japanese Patent Application Publication No. H11-95160 fails to disclose a specific method of manufacturing a louver, it might be possible to manufacture a louver of a head mounted display by using the method described in Japanese Patent Application Publication No. 2009-186879, for example.

However, if the louver manufactured by using the method described in Japanese Patent Application Publication No. 2009-186879 is used for a head mounted display, the display properties may vary in the screen. That is, the reduction effect for external-light ghost may vary depending on positions of the screen, and the display brightness may become uneven in the display screen.

SUMMARY OF THE INVENTION

According to a first aspect of the present invention, a louver includes a first member made of transparent material, a second member made of transparent material, and a plurality of light blocking portions made of light blocking material. The first member and the second member are configured to join with each other, with the plurality of light blocking portions being interposed between the first member and the second member. A first main surface of each of the plurality of light blocking portions is in contact with the first member and a second main surface of each of the light blocking portions is in contact with the second member. The first member includes convex portions, each of the convex portions being configured to project from the first main surface of one of the plurality of light blocking portions toward a center line of the louver by a first distance and have a first length along the center line. One end surface of each of the plurality of light blocking portions in a direction along the center line is in contact with one of the convex portions, and another end surface of the each of the plurality of light blocking portions is in contact with the second member.

According to a second aspect of the present invention, a louver includes a first member made of transparent material, a second member made of transparent material, and a plurality of light blocking portions made of light blocking material. The first member and the second member are configured to join with each other, with the plurality of light blocking portions being interposed between the first member and the second member. A first main surface of each of the plurality of light blocking portions is in contact with the first member and a second main surface of each of the light blocking portions is in contact with the second member. The first member includes concave portions, each of the concave portions being configured to be retracted from the first main surface of one of the plurality of light blocking portions toward a direction opposite to a center line of the louver by a first distance and have a first length along the center line. One end portion of each of the plurality of light blocking portions in a direction along the center line is positioned at an edge of one of the concave portions, and another end portion of the each of the plurality of light blocking portions is in contact with the second member.

According to a third aspect of the present invention, a louver includes a first member made of transparent material, a second member made of transparent material, and a plurality of light blocking portions made of light blocking material. The first member and the second member are configured to join with each other, with the plurality of light blocking portions being interposed between the first member and the second member. The first member includes concave portions, each of the concave portions being configured to be retracted toward a direction parallel to a center line of the louver. A first main surface of each of the plurality of light blocking portions is in contact with the first member, one portion of a second main surface of the each of the plurality of light blocking portions is in contact with the first member, and another portion of the second main surface is in contact with the second member. One end portion of the each of the plurality of light blocking portions in a direction along the center line is in contact with one of the concave portions by a first length along the center line, and another end portion of the each of the plurality of light blocking portions is in contact with the second member.

According to a fourth aspect of the present invention, a method of manufacturing a louver includes forming a first member by using transparent material, giving paint onto a first surface of the first member, the paint being a material of a light blocking portion, and forming a second member by covering the first member onto which the paint has been given, with transparent material. The first member includes a convex portion that projects from the first surface toward a center line of the first member by a first distance and have a first length along the center line. The paint given onto the first surface abuts against the convex portion.

According to a fifth aspect of the present invention, a method of manufacturing a louver includes forming a first member by using transparent material, giving paint onto a first surface of the first member, the paint being a material of a light blocking portion, and forming a second member by covering the first member onto which the paint has been given, with transparent material. The first member includes a concave portion that is retracted from the first surface toward a direction opposite to a center line of the first member by a first distance and have a first length along the center line. The paint given onto the first surface spreads to an edge of the concave portion.

According to a sixth aspect of the present invention, a method of manufacturing a louver includes forming a first member by using transparent material, giving paint onto a first surface of the first member, the paint being a material of a light blocking portion, and forming a second member by covering the first member onto which the paint has been given, with transparent material. The first member includes a concave portion that is retracted toward a direction parallel to a center line of the first member and that has a depth of a first length. The paint given onto the first surface fills the concave portion.

Further features of the present invention will become apparent from the following description of exemplary embodiments with reference to the attached drawings.

DESCRIPTION OF THE EMBODIMENTS

First, for allowing readers to easily understand the embodiments of the present invention, the reason that the louver manufactured by using the manufacturing method described in Japanese Patent Application Publication No. 2009-186879 cannot deliver the performance for the head mounted display will be described. The reason has been found by the present inventor by studying the louver manufactured by using the manufacturing method described in Japanese Patent Application Publication No. 2009-186879, and used for the head mounted display.

Figure 18A:
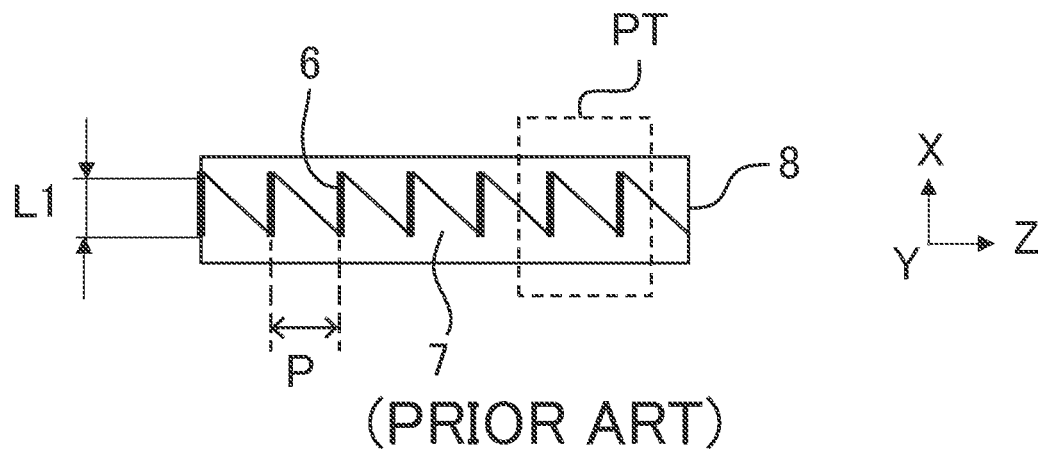
FIG. 18A is a diagram schematically illustrating a cross section of a louver manufactured by using a conventional manufacturing method.

FIG. 18A schematically illustrates a cross section of a louver manufactured by using the manufacturing method described in Japanese Patent Application Publication No. 2009-186879. On a side surface of a convex portion formed on a transparent base layer 7, a light blocking layer 6 is formed by spraying the side surface with black quick-drying paint; and on the light blocking layer 6, a transparent coating layer 8 is formed. Unlike the louver of a house window used for controlling the daylight, in a louver used for a head mounted display, the light blocking layer has a length L1 that is set, for example, in a range from 0.3 to 3 mm. As described above, the length L1 of the light blocking layer is set shorter. Thus, if an error in shape occurs in the light blocking layer, the ratio of the error to the whole length of the light blocking layer becomes relatively larger. For example, suppose that an error of 0.1 mm is produced in a manufacturing process. If the whole length of the light blocking portion of a louver for a window, used for controlling the daylight, is set at 30 mm, the ratio of the error to the whole length of the light blocking portion is 10 to 100 times larger in the louver used for a head mounted display, than in the louver for a window used for controlling the daylight. In addition, the louver used for a head mounted display is disposed close to a user's eye. Thus, if the length or the thickness of the light blocking layer has an error, the angle of view in which a user can visually recognize an image and the amount of external light that enters the head mounted display may change disadvantageously.

Figure 18B:
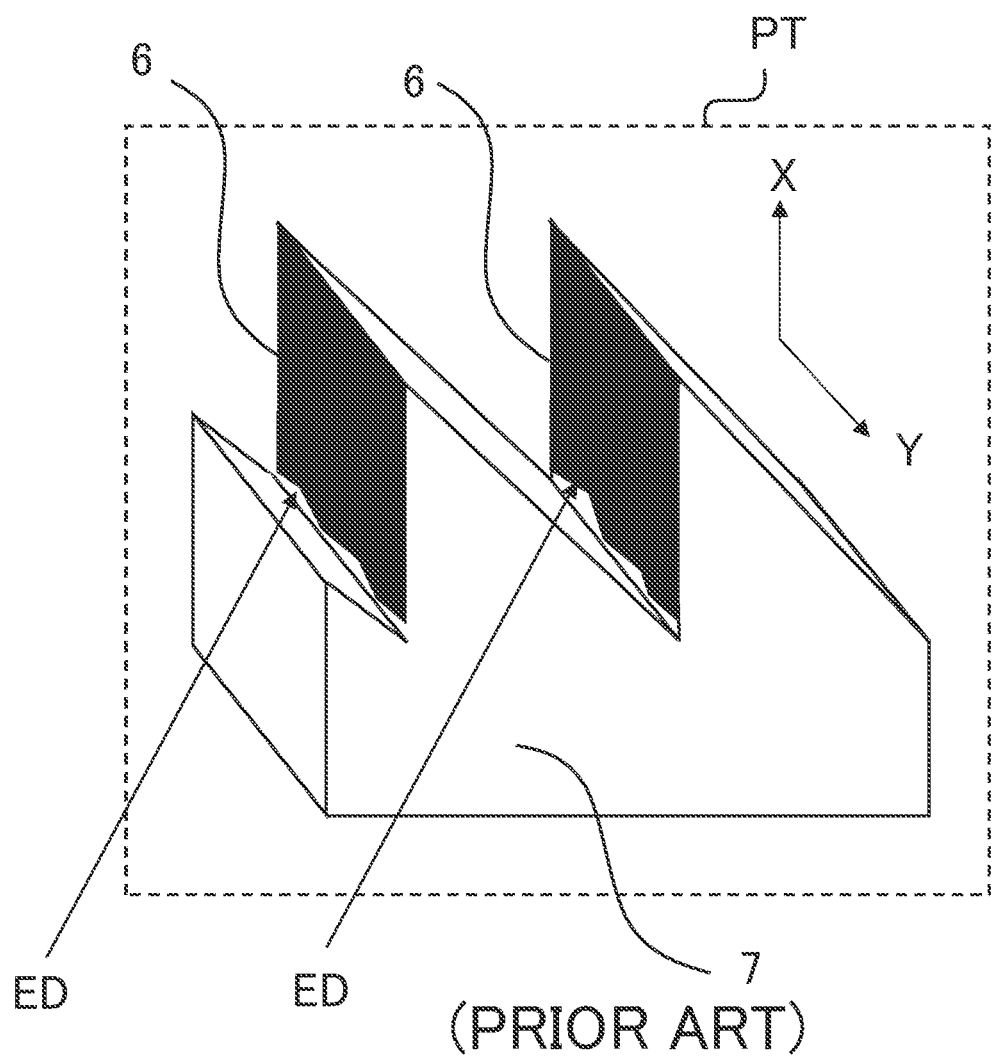
FIG. 18B is a perspective view of a louver manufactured by using a conventional manufacturing method, in which one portion PT of the louver is enlarged and a transparent coating layer 8 is removed.

FIG. 18B is a perspective view illustrating a state in which one portion PT of the louver illustrated in FIG. 18A is enlarged and the transparent coating layer 8 is removed. As illustrated in FIG. 18B, a lower edge portion ED of the light blocking layer 6 has an irregular-wave shape. Since the edge portion ED has an irregular-wave shape, the length of the light blocking layer 6 measured in an X direction changes in a Y direction. In addition, not only the length of the light blocking layer 6 in the X direction, but also the thickness of the light blocking layer 6 changes. Thus, when the louver was disposed in a head mounted display, the uniformity of brightness and the uniformity of ghost reduction effect were deteriorated in the display screen. This is because the length L1 of the light blocking layer along the optical axis and the thickness of the light blocking layer vary, depending on positions in the louver.

The present inventor has found that the irregular shape of the edge portion ED of the light blocking layer is caused by the paint when the light blocking layer 6 is formed by spraying the side surface of the convex portion of the transparent base layer 7, with the black quick-drying paint. Specifically, the irregular shape of the edge portion ED is formed because the paint locally varies in spreading over the side surface, and dries. The present inventor tried to adjust the amount of quick-drying paint applied onto the side surface of the convex portion, for preventing the shape of the edge portion ED from locally varying, but it was difficult to reduce the variation of the shape. That is, it was not possible to reduce the occurrence of the wave shape even when the amount of coating was reduced. If the amount of coating is increased, the paint may flow across the side surface of the convex portion of the transparent base layer 7; and in a local portion, may reach a slope that is not intended to be coated. In addition, if the amount of coating is increased, the thickness of the light blocking layer may easily vary in a local portion of the light blocking layer. Since a local portion of the light blocking layer having an excessive thickness may limit the angle of view of the display light, increasing the amount of coating is not suitable for a louver used for a head mounted display. In addition, if the thickness of the paint applied varies locally, the difference in concentration of the light blocking material, contained in the paint applied, is produced, possibly causing uneven light blocking performance of the light blocking layer. Thus, in the consideration of yields in the mass production, reducing the local irregular shape of the edge portion of the light blocking layer by adjusting the amount of paint to be applied is not practicable.

In the following embodiments of the present invention, a louver used for a head mounted display and including a light blocking portion in which the variations in shape are reduced, a method of manufacturing the louver, and the head mounted display including the louver will be described.

Note that since the embodiments and the examples described below are examples, detailed configurations and the like can be modified as appropriate by a person skilled in the art without departing the spirit of the present invention.

In addition, in the drawings referred to in the following description, a component given an identical reference numeral has an identical function, unless otherwise specified.

First Embodiment

Figure 1:
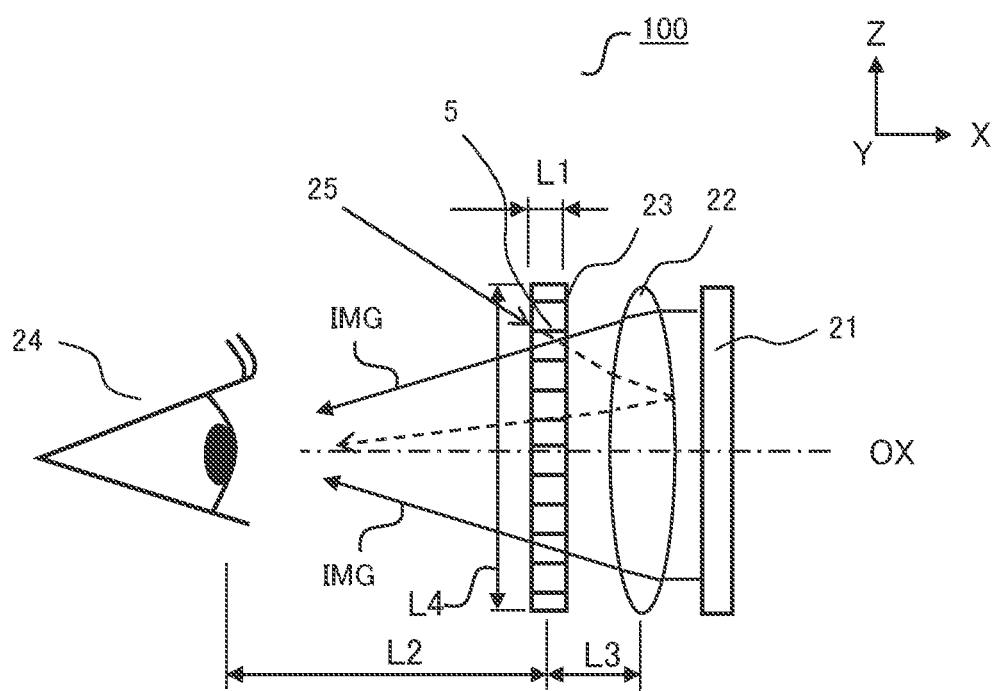
FIG. 1 is a schematic diagram illustrating a configuration of an optical system of a head mounted display of a first embodiment.

FIG. 1 is a schematic diagram illustrating a configuration of an optical system of a head mounted display 100 of a first embodiment. Note that in FIG. 1, components for mounting the head mounted display 100 on a user's head, a housing, a communication portion for transmitting/receiving image information, a power supply portion, and the like are not illustrated.

FIG. 1 illustrates a display panel 21 that serves as a display portion, an optical element 22 that serves as an optical portion, a louver 23, and a user's eye 24. The head mounted display 100 includes a single optical-system unit for a right eye, and a single optical-system unit for a left eye. Thus, a display panel for the unit for a right eye displays an image for the right eye, and a display panel for the unit for a left eye displays an image for the left eye. FIG. 1 illustrates the single optical-system unit for a right eye or the single optical-system unit for a left eye. For example, the display panel 21 is an organic electroluminescence (organic EL) panel or a liquid crystal panel.

The optical element 22, which serves as an optical portion, condenses display light IMG emitted from the display panel 21 so that the display light IMG is focused on or near a user's eye. Thus, a user recognizes an image displayed on the display panel 21, as an enlarged image having a distance of distinct vision. The optical element 22 is disposed on the optical path of the display light IMG connecting the display panel 21 and the position of the user's eye 24, such that an optical axis OX of the optical element 22 extends from the center of the display panel 21 to the user's eye 24. Typically, the optical element 22 is a single convex lens. However, the optical element 22 may be a lens system in which a plurality of lenses is combined with each other so as to have the positive power as a whole. In addition, in a case where the optical element 22 is a lens system, the optical element 22 may include a component that does not have a function to form an image. For example, the optical element 22 may include a component that causes the light from the whole of the display panel 21, to be incident on a user's eye in an efficient manner.

The louver (louver element) 23 is a plate-like member disposed in an optical-path space in which the optical path of the display light IMG, which travels from the optical element 22 to the user's eye, is formed. In other words, the louver 23 is disposed on the optical path of the display light IMG extending from the optical portion (that directs the display light outputted from the display panel toward the user's eye) toward the user's eye.

The louver 23 includes a plurality of light blocking portions 5. As illustrated in FIG. 1, the light blocking portions 5 are positioned and oriented so that the light blocking portions 5 effectively block external light 25 from traveling toward the optical element 22, while hardly blocking the display light IMG from traveling from the optical element 22 toward the user's eye 24. In FIG. 1, the length of the light blocking portions 5 of the louver 23 along the optical axis OX is denoted by L1. In addition, the distance from the user's eye 24 to the center of the louver 23 along the optical axis OX is denoted by L2, and the distance from the center of the louver 23 to the center of the optical element 22 is denoted by L3. Note that the center of the louver 23 is the center of the light blocking portions 5 obtained when the louver 23 is viewed along the optical axis OX. Preferably, the length L1 is set in a range equal to or larger than 0.3 mm and equal to or smaller than 3 mm, the distance L2 is set in a range equal to or smaller than 30 mm, and the distance L3 is set in a range equal to or larger than 5 mm and equal to or smaller than 25 mm. In addition, a length L4 of the louver 23 in the vertical direction is set so that the louver 23 covers the cross section of the optical path of the display light IMG that travels from the optical element 22 toward the user's eye.

The light blocking portions 5 of the louver 23 are disposed at a position and posture that allows the light blocking portions 5 to block the external light 25 that travels toward the optical element 22, while transmitting most of the display light IMG that travels from the optical element 22 toward the user's eye 24. The external light 25 indicated by a solid line in FIG. 1 reaches the light blocking portions 5 of the louver 23, but is blocked by the light blocking portions 5. Thus, the external light 25 does not travel along an optical path indicated by a dotted line, so that the external light 25 is sufficiently suppressed from reaching the user's eye 24, as an external-light ghost.

Figure 2:
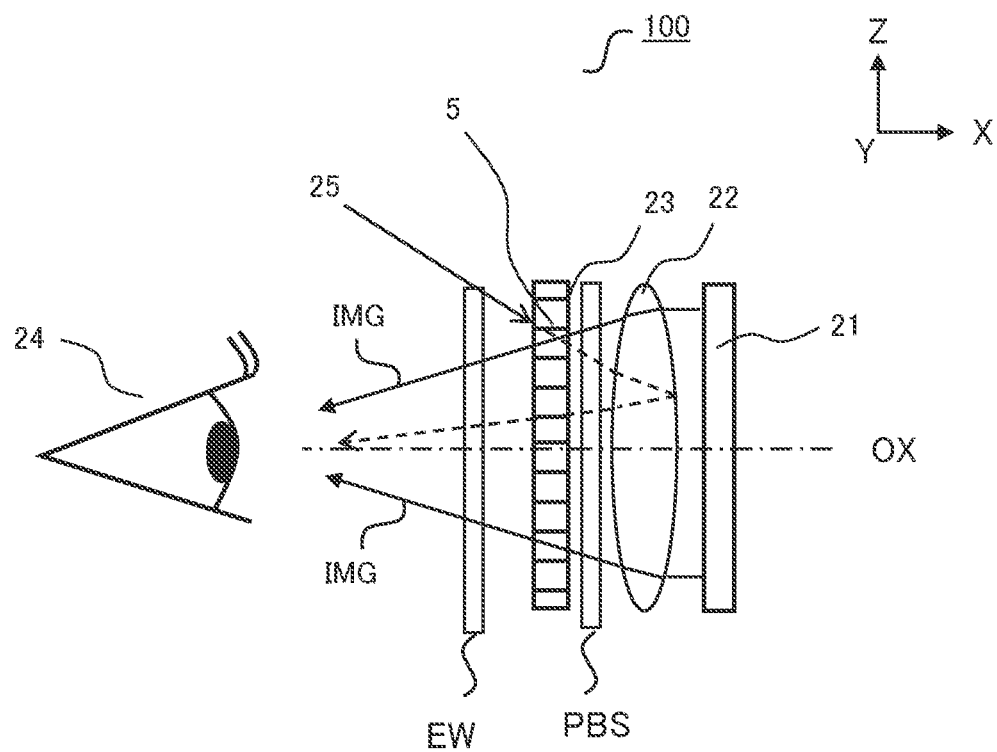
FIG. 2 is a schematic diagram illustrating a configuration of an optical system of a head mounted display of a modification of the first embodiment.

Note that the head mounted display 100 may further includes an optical element. For example, as illustrated in FIG. 2, the head mounted display 100 may include a polarizing beam splitter (PBS) between the optical element 22 and the louver 23. In another case, the head mounted display 100 may include a window member EW (that is a transparent plate member) between the louver 23 and the user's eye 24, for protecting the interior of the apparatus from dust or the like. Also in such a case, the louver 23 of the present embodiment is disposed in an optical-path space in which the optical path of the display light IMG, which travels from the optical element 22 toward the user's eye, is formed.

Figure 4:
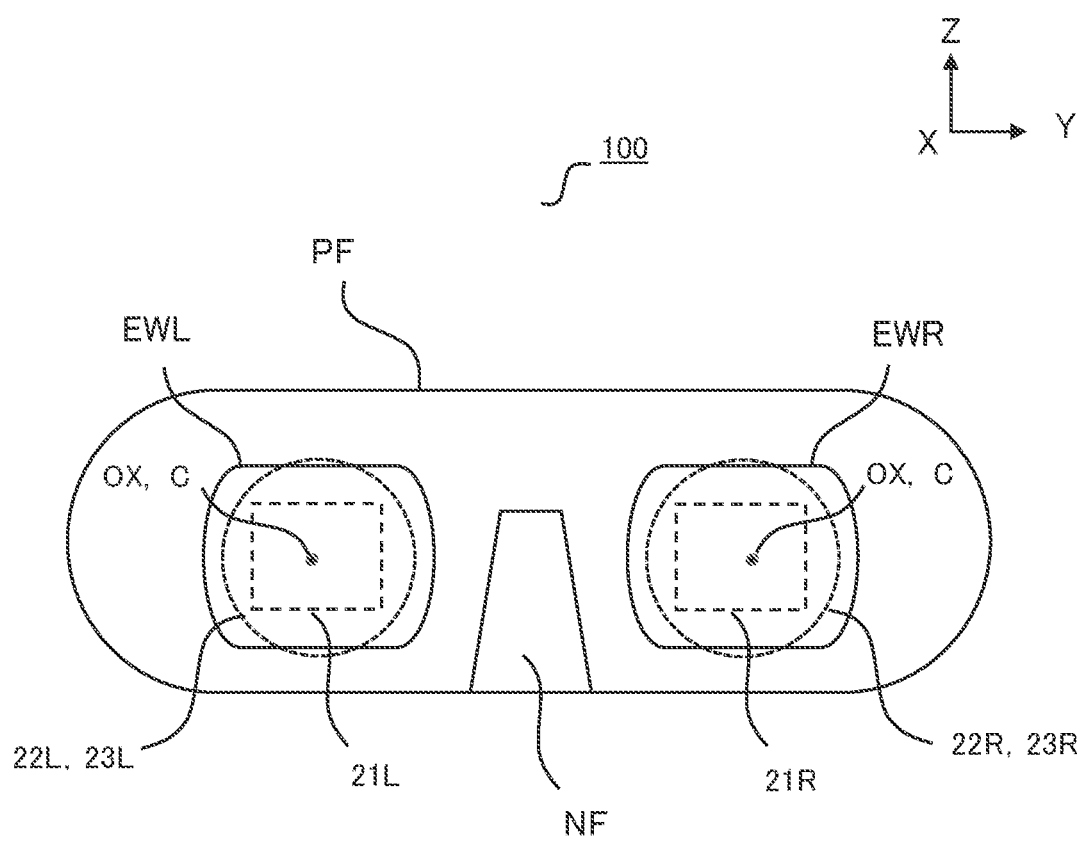
FIG. 4 is a plan view in which a head mounted display of an embodiment is viewed from a user side.

FIG. 4 is a plan view in which the head mounted display 100 of an embodiment is viewed from a user side. Note that since FIG. 4 is a schematic diagram for illustrating a configuration of the optical system, components for mounting the head mounted display 100 on a user's head, a communication portion for transmitting/receiving image information, a power supply portion, and the like are not illustrated in FIG. 4.

A frame (frame portion) PF is made of light blocking material, and functions as a housing that supports display panels and optical members. The frame PF serves also as a cover that blocks external light coming from the front direction. In the frame PF, a nose-pad portion NF is formed for positioning the head mounted display 100 with respect to a user's face. For a user's right eye, a window member EWR, a louver 23R, an optical system 22R, and a display panel 21R are disposed in this order from a user's face side. For a user's left eye, a window member EWL, a louver 23L, an optical system 22L, and a display panel 21L are disposed in this order from a user's face side. Note that if the louver 23 serves also as the window member, as illustrated in FIG. 1, that protects the interior of the apparatus from dust or the like, the window members EWR and EWL may not be disposed.

Preferably, the aspect ratio of each of the display panels 21R and 21L is 4:3 or 16:9. However, the present disclosure is not limited to this. The display panel, the condensing optical system, and the louver are disposed such that in a plan view in which the head mounted display 100 is viewed from a user side, the center of the display panel, the optical axis OX of the condensing optical system, and a center line C of the louver overlap with each other. However, for causing the convergence, the center of the display panel, the optical axis OX of the condensing optical system, and the center line C of the louver may be slightly shifted from each other.

In addition, as illustrated in FIG. 4, the outer shape of the louver may be made substantially equal to the outer shape of the condensing optical system (e.g., the outer shape of a convex lens or a concave mirror). In this case, increasing the use efficiency of the display light and blocking the external light can be both achieved with good balance.

Louver Element

Figure 3A:
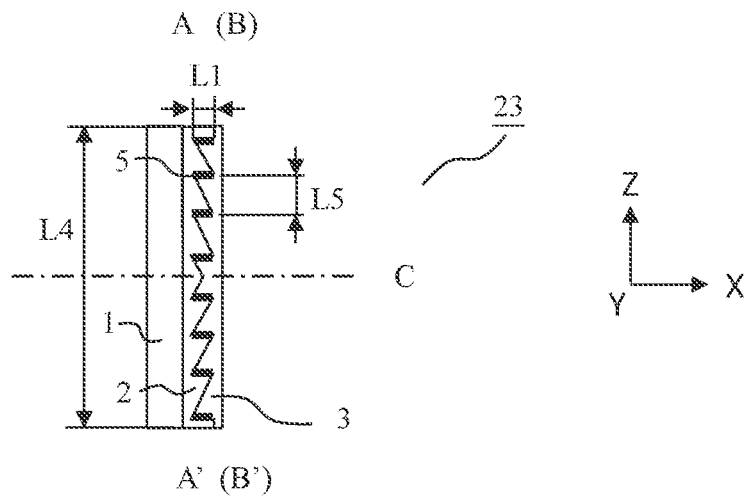
FIG. 3A is a schematic cross-sectional view illustrating a cross section of a plate-like louver 23, taken along a direction perpendicular to a main surface of the louver 23.
Figure 3B:
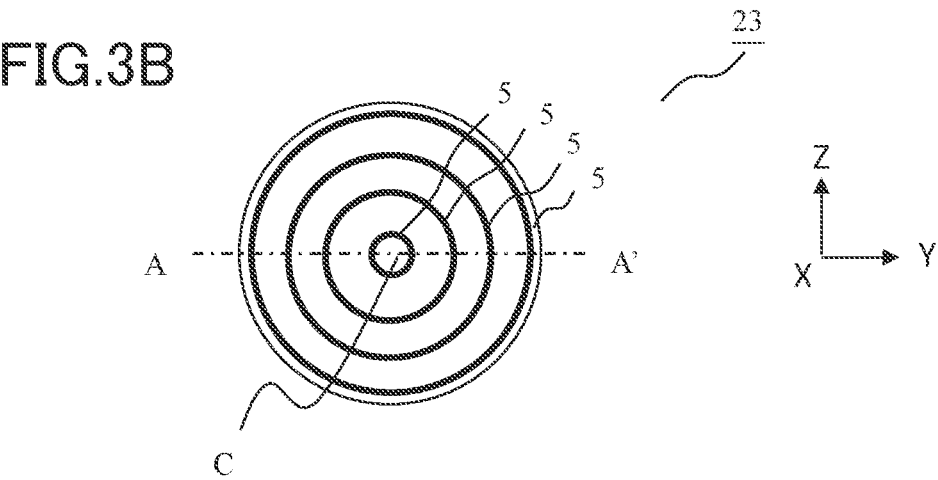
FIG. 3B is a plan view of the louver 23 in which a main surface of the louver 23 is viewed from a direction of an optical axis OX.

Next, the louver (louver element) 23 will be described in detail with reference to the accompanying drawings. FIG. 3A is a schematic cross-sectional view illustrating a cross section of the plate-like louver 23, taken along a direction perpendicular to a main surface of the louver 23. FIG. 3B is a plan view in which the main surface of the plate-like louver 23 is viewed from the direction of the optical axis OX illustrated in FIG. 1. Note that the cross-sectional view of FIG. 3A illustrates a cross section of the louver 23, taken along a line A-A' of FIG. 3B. In each of the drawings, a coordinate system that corresponds to the XYZ coordinate system illustrated in FIG. 1 is provided for showing the posture of the louver 23 mounted in the head mounted display 100. The center line C is a line that passes through a center point of the louver 23 located in a plan view of the louver 23, and that is perpendicular to a main surface of the louver 23. In FIG. 3A, the center line C is indicated by an alternate long and short dashed line. The louver 23 is mounted in the head mounted display 100 such that the center line C is substantially equal to the optical axis OX of the optical element 22.

As illustrated in FIG. 3B, when viewed from the direction of the optical axis OX of the optical element 22, the plurality of light blocking portions 5 of the louver 23 are formed along a plurality of concentric circles having different diameters. The louver 23 is mounted in the head mounted display 100 such that the center of the concentric circles is located on the optical axis OX of the optical element 22.

Figure 3C:
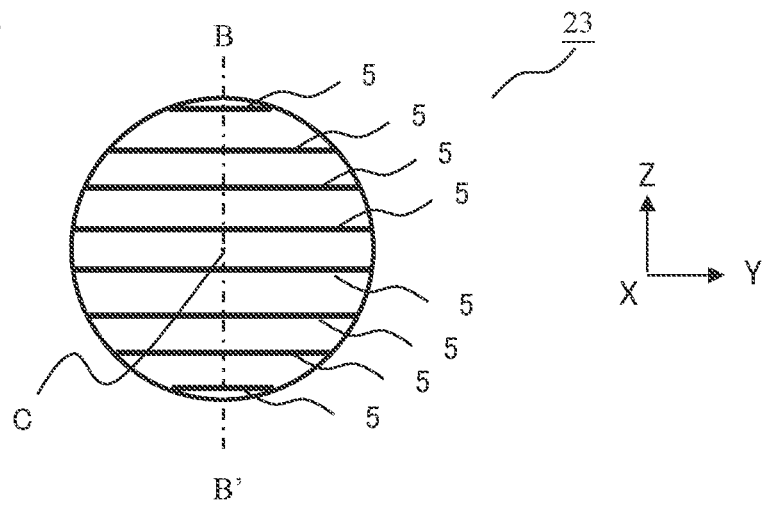
FIG. 3C is a plan view of a louver 23 of a modification in which a main surface of the louver 23 is viewed from a direction of an optical axis OX.

Note that in the present embodiment, the shape of the light blocking portions 5 in a plan view is not limited to the shape of the plurality of concentric circles illustrated in FIG. 3B. For example, the shape of the light blocking portions 5 in a plan view may be a shape of stripes as illustrated in FIG. 3C. In this case, FIG. 3A is a cross-sectional view taken along a line B-B' of FIG. 3C.

The louver 23 is a plate-like optical element, as a whole. Specifically, the louver 23 is an optical element in which a substrate 1 made of transparent material, a first member 2 made of transparent resin material, a second member 3 made of transparent resin material, and the light blocking portions 5 made of light blocking material are integrated with each other. Note that in the following description, the first member 2, the second member 3, and the light blocking portions 5 may be collectively called a louver body.

In the embodiment illustrated in FIG. 3A, the louver 23 includes the substrate 1. However, if the mechanical strength of the louver 23 is ensured by the louver body alone, the louver 23 may not include the substrate 1, and may be constituted by the first member 2, the second member 3, and the light blocking portions 5. In contrast, if the louver body is required to be protected more securely, another substrate 1 may be disposed on the second member 3 side, in addition to the substrate 1 disposed on the first member 2 side. In this case, the louver body will be sandwiched by the two substrates 1.

Hereinafter, the substrate and the louver body will be described in this order, and after that, a structure in the vicinity of an end portion of the light blocking portion 5 and a method of forming the light blocking portion 5 will be described in detail. The structure and the method are features of the present embodiment.

Substrate

The substrate 1 may be made of any one of a glass material and an optical resin material as long as the glass material and the optical resin material have desired optical properties, such as transparency. If the importance is placed on less variation of properties (reliability, durability), the glass material is suitably used. The glass material may be one of various glass materials including a commonly used optical glass, a quartz glass, and a glass ceramic. Examples of the optical glass include a silicate glass, borosilicate glass, and a phosphate glass. If the importance is placed on costs or weight reduction, a resin is suitable used. Examples of the resin include a thermoplastic resin, a thermosetting resin, an ultraviolet curable resin, and a two-component curable resin. Examples of the thermoplastic resin include polymethylmethacrylate (PMMA), polycarbonate, polystyrene, MS resin, AS resin, polyolefin such as polyethylene or polypropylene, polyester such as polyethylene terephthalate or polybutylene terephthalate, polyvinyl chloride, cellulose acylate, thermoplastic elastomer, and cycloolefin polymer. Examples of the thermosetting resin include phenol resin. As the resin used for the substrate 1, one of the above-described resins may be used, or two or more of the above-described resins may be used. The substrate 1 may be made by using, for example, a thermal imprint method, an optical imprint method, an extrusion molding method, or an injection molding method. The main surface of the substrate 1 in a cross-sectional view may not necessarily be a flat surface as illustrated in FIG. 3A, and may be a concave spherical surface, a convex spherical surface, an axially symmetric aspherical surface, or the like. In addition, the outer shape of the substrate 1 viewed from the direction perpendicular to the main surface of the substrate 1 (i.e., a direction along the center line C) may be one of various shapes, and may be selected from a circular shape and a rectangular shape.

Louver Body

Figure 5A:
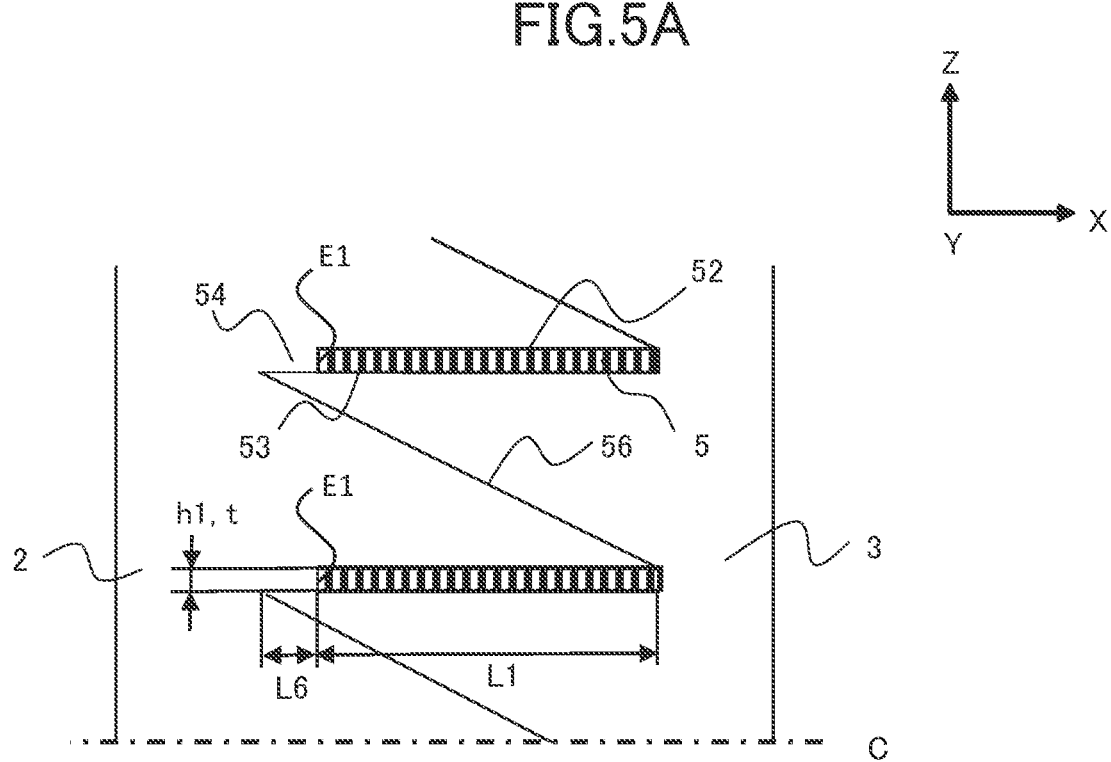
FIG. 5A is a partially enlarged cross-sectional view in which one portion of a louver body of the first embodiment is enlarged.
Figure 5B:
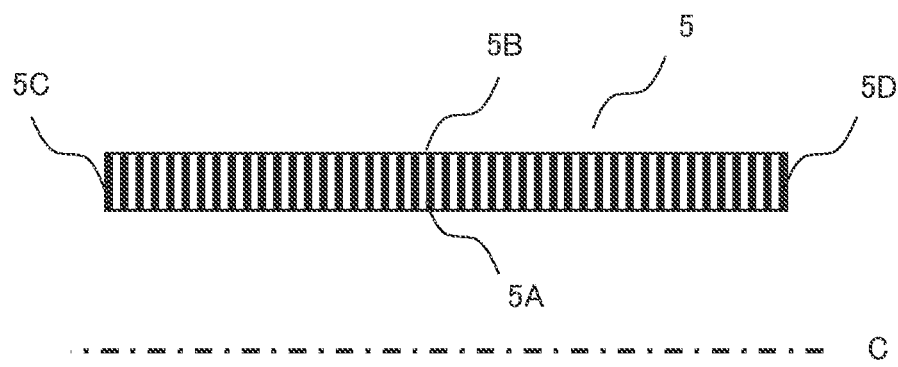
FIG. 5B is a diagram illustrating each surface of a light blocking portion 5.

FIG. 5A is a partially enlarged cross-sectional view in which one portion of the louver body is enlarged. The louver body includes the first member 2, the second member 3, and the plurality of light blocking portions 5. FIG. 5B is a diagram for distinguishing external surfaces of each of the light blocking portions 5. In the following description, a main surface of each of the light blocking portions 5 closer to the center line C (i.e., the optical axis OX of the optical element 22) may be referred to as a main surface 5A (second main surface), and a main surface of each of the light blocking portions 5 separated more from the center line C (i.e., the optical axis OX of the optical element 22) may be referred to as a main surface 5B (first main surface). In addition, one end surface of each of the light blocking portions 5, located on one side when viewed along the center line C (i.e., the optical axis OX of the optical element 22), may be referred to as an end surface 5C, and the other end surface may be referred to as an end surface 5D.

As illustrated in FIG. 5A, a main surface of the first member 2 located on a side from which the display light IMG is outputted in a state where the louver is mounted in the head mounted display, is a flat surface. And a main surface (that faces the second member 3) of the first member 2 located on a side into which the display light IMG is inputted in a state where the louver is mounted in the head mounted display, has concave and convex portions. In addition, a main surface of the second member 3 located on a side into which the display light IMG is inputted in a state where the louver is mounted in the head mounted display, is a flat surface. And a main surface (that faces the first member 2) of the second member 3 located on a side from which the display light IMG is outputted in a state where the louver is mounted in the head mounted display, has concave and convex portions. Note that if the main surface of the substrate 1 (FIG. 3A) is not flat, each of the above-described flat surfaces of the first member 2 and the second member 3 may be changed to a surface (nonflat surface) in accordance with the shape of the main surface of the substrate 1.

The concave and convex portions of the first member 2 and the concave and convex portions of the second member 3 join with each other, with the light blocking portions 5 being interposed between the first member 2 and the second member 3; and the first member 2 and the second member 3 are integrated with each other. The first member 2 is in contact with the main surface 5B and the end surface 5C of the light blocking portion 5, and the second member 3 is in contact with the main surface 5A and the end surface 5D of the light blocking portion 5.

The material of the first member 2 and the material of the second member 3 have a substantially identical refractive index. Preferably, the first member 2 and the second member 3 are made of an identical type of resin material. The resin material may be any one of resin materials as long as the resin materials have sufficient optical properties, such as transmittance, and sufficient reliability. Preferably, a photosensitive resin material is suitably used because the first member 2 and the second member 3 can be easily manufactured by using the photosensitive resin material. Specifically, an acrylate-based resin, a polycarbonate resin, silicon resin, or the like is suitably used. The optical resin material may contain inorganic fine particles for achieving predetermined optical properties. The type of the inorganic fine particles contained in the optical resin material is selected in consideration of desired optical properties. Specifically, examples of the type of the inorganic fine particles include zirconia oxide, titanium oxide, zinc oxide, indium oxide, tin oxide, antimony oxide, indium tin oxide (ITO), antimony-doped tin oxide (ATO), and zinc-doped indium oxide (IZO).

The concave and convex portions of the first member 2 and the concave and convex portions of the second member 3 may have any shape as long as the concave and convex portions of the first member 2 and the concave and convex portions of the second member 3 can join with each other and can form the light blocking portions 5 at a predetermined position and posture, as described below. As illustrated in FIGS. 3A and 5A, the cross-sectional shape of the concave and convex portions is preferably a sawtooth shape in which triangles are aligned with each other. However, the cross-sectional shape may be another shape. For example, the cross-sectional shape may be a shape in which triangles such as isosceles triangles or right triangles, rectangles, trapezoids, semicircles, or the like are continuously aligned with each other.

When a portion in which the first member 2 and the second member 3 join with each other is viewed along a Z direction (orthogonal to the main surface), portions in each of which the first member 2 and the second member 3 are in contact with each other, and portions in each of which a light blocking portion 5 is held by the first member 2 and the second member 3 are alternately formed.

The first member 2 and the second member 3 are in contact with each other at a slope 56. Since the slope 56 is an interface at which the identical materials are in contact with each other, the slope 56 causes no optical effect and serves as a window that transmits the display light IMG.

On the other hand, the light blocking portion 5 is held between a surface 52 (first surface) of the first member 2 and a surface 53 of the second member 3. When viewed from the direction of the optical axis OX illustrated in FIG. 1, the light blocking portions 5 are formed such that a transparent portion is held by adjacent light blocking portions, as illustrated in FIGS. 3B and 3C. As illustrated in FIG. 1, the light blocking portions 5 are positioned and oriented so that the light blocking portions 5 effectively block the external light 25 from traveling toward the optical element 22, while hardly blocking the display light IMG from traveling from the optical element 22 toward the user's eye 24.

When the louver 23 is mounted in the head mounted display 100, the center C of the louver element is positioned on the optical axis of the condensing optical portion, that is, on the optical axis OX of the optical element 22 illustrated in FIG. 1. In other words, the center C of the louver element is positioned on the line connecting the center of the screen of the display panel 21 and the position of the user's eye 24. If the concentric light blocking portions illustrated in FIG. 3B are used, the light blocking portions cause excellent uniformity in brightness of a displayed image. In addition, the use of the concentric light blocking portions makes it easy to manufacture the louver by using a mold and a dispenser. For example, this is because the stress applied evenly in all directions causes less strain, and because the light blocking material can be easily applied if the substrate is rotated. In a case where the linear light blocking portions illustrated in FIG. 3C are used, the light blocking portions can selectively increase the light blocking effect against the external light coming from a predetermined direction, such as an upper direction or a lateral direction.

As illustrated in FIG. 3A, a distance (interval) between adjacent light blocking portions is denoted by L5, and as illustrated in FIG. 5A, the thickness of a light blocking portion (i.e., the width of a light blocking portion viewed from the direction of the optical axis OX) is denoted by t. Preferably, in the louver used for a head mounted display, a value t/L5 is equal to or smaller than 10%. Specifically, it is preferable that the distance L5 be set at a value in a range equal to or larger than 0.3 mm and equal to or smaller than 3 mm, and that the thickness t be set at a value in a range equal to or larger than 0.1 µm and equal to or smaller than 50 µm. In addition, it is preferable that a length L1 of the light blocking portion 5 in the optical-axis direction be set at a value in a range equal to or larger than 0.3 mm and equal to or smaller than 3 mm.

This is because it is preferable to make the thickness t equal to or larger than 0.1 µm, the distance L5 equal to or smaller than 3 mm, and the length L1 equal to or larger than 0.3 mm, for securing sufficient external-light blocking performance of the louver used for a head mounted display. However, if the thickness t is larger than 50 µm, the distance L5 is smaller than 0.3 mm, or the length L1 is larger than 3 mm, the percentage at which the light blocking portions 5 block the display light IMG will increase, causing displayed images to be darkened. For this reason, it is preferable that the thickness t, the distance L5, and the length L1 be set so as to have values in the above-described ranges. In particular, if t/L5<10% is satisfied, preventing ghost caused by the external light, and ensuring the brightness and uniformity of a displayed image can be both achieved with good balance.

The light blocking portions 5 have only to block the visible light components of the external light 25 from traveling toward the optical element 22. Thus, the light blocking portions 5 are made of light-absorbing material that absorbs the visible light, or are made of light-reflecting material that reflects the visible light. In another case, the light blocking portions 5 may have a multilayer structure in which the light-absorbing material and the light-reflecting material are layered on each other. Note that if the light-reflecting material that reflects the visible light is used, the position and the shape of the light blocking portions 5 are set such that the external light reflected from the light-reflecting material does not become stray light.

The material that constitutes the light blocking portions 5 and that absorbs the visible light may be selected appropriately from a coating material that contains pigment and a coating material that contains dye. In particular, a black coating material is preferably selected if high light-absorption capacity is required, and a coating material that contains pigment is preferably used if high durability is required. Examples of the pigment include ivory black, peach black, lamp black, bitume, carbon black, and aniline black. Among these pigments, carbon black or aniline black is preferably used. Note that the color material can be selected and used as appropriate, for example, for producing the effect in accordance with a wavelength of the incident external light.

The reflection layer formed as the light blocking portion may be a specular reflection type or a diffuse reflection type. The specular reflection type can reduce the external-light ghost by reflecting the external light toward a direction in which the external light does not affect the display light IMG observed by a user. Preferably, the light reflection layer of the specular reflection type is made by using a liquid coating material that contains a metallic pigment, such as aluminum, silver, nickel, stainless steel, copper, zinc, or iron. If fine powder made from one of aluminum, silver, nickel, and stainless steel, or from a mixture thereof is used, a silvery light reflection layer of the specular reflection type is formed. If fine powder made from one of copper, zinc, or iron, or from a mixture thereof is used, a red or red-copper-colored light reflection layer of the specular reflection type is formed. The diffuse reflection type easily evens the distribution in the amount of light, reduces the external-light ghost, and reduces unevenness in brightness. Preferably, the light reflection layer of the diffuse reflection type is made by using a liquid coating material that contains a pigment, such as silver white, titanium white, zinc white, or aluminum powder.

The method of giving a liquid coating material for forming the light blocking portions is not limited to a particular method, and can be selected from appropriate methods. For example, a coating method may be used. In the coating method, a predetermined concave and convex surface of the first member 2 and/or the second member 3 is coated with a material that contains a coloring agent. The coating method for forming the light blocking portions 5 includes a contact coating method and a noncontact coating method. In the contact coating method, a predetermined concave and convex surface of the first member 2 and/or the second member 3 is coated with a material that contains a coloring agent, by using a brush or a sponge for example. The brush is used also in the edge-blackening of lenses. In the non-contact coating method, a predetermined concave and convex surface of the first member 2 and/or the second member 3 is coated with a material that contains a coloring agent, by using a spray or a dispenser for example. As described below, when a dispenser is used, a coating material is given from an oblique direction toward a predetermined concave and convex surface of the first member 2 and/or the second member 3, so that the light blocking portions can be formed.

Figure 8A:
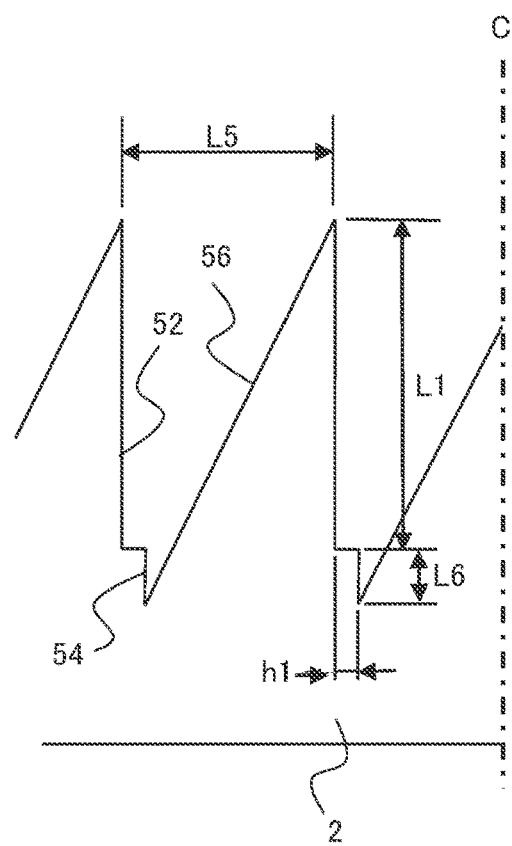
FIG. 8A is a partial cross-sectional view in which one portion of a first member 2 of the first embodiment is enlarged.

As illustrated in FIGS. 5A and 8A, a step portion 54 is formed on the first member 2. The step portion 54 is formed continuous with the surface 52, and projects from the surface 52 toward the center line C. The shape and effect of the step portion 54 will be described below. In the present embodiment, an end portion E1 of the light blocking portion 5 is in contact with the step portion 54 even if the step portion 54 and the end portion E1 are viewed in a different position in the Y direction (that is, even if the step portion 54 and the end portion E1 are viewed in a different cross-sectional view in the Y direction). In other words, the shape of the end portion E1 of the light blocking portion 5 is defined by the edge surface of the step portion 54. Thus, unlike the edge portion ED illustrated in FIG. 18B, the end portion E1 of the light blocking portion 5 has no irregular-wave shape. Since the step portion 54 has a desired shape formed with high accuracy through molding as described below, the shape of the light blocking portion 5 can be controlled with high accuracy. Thus, the present embodiment can provide a louver used for a head mounted display and having light blocking portions whose shape is formed with high accuracy.

Method of Manufacturing Louver

Next, a method of manufacturing a louver of the present embodiment will be described with reference to FIGS. 6A to 6D, 7A to 7C, 8A, 8B, 9A, and 9B.

Figure 6A:
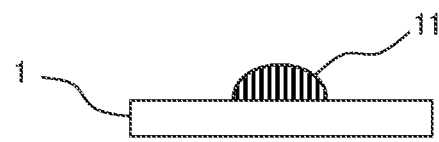
FIG. 6A is a diagram illustrating a stage in which a resin material is given onto a substrate in a method of manufacturing a louver of an embodiment.

First, as illustrated in FIG. 6A, a proper amount of ultraviolet-curable resin material 11 is given onto the substrate 1 for forming the first member 2.

Figure 6B:
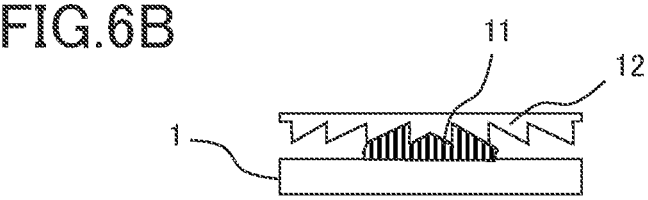
FIG. 6B is a diagram illustrating a stage in which the resin material on the substrate is being molded by using a mold.

Then, as illustrated in FIG. 6B, the resin material 11 is pressed by using a mold 12 used for forming the shape of the first member 2 as a replica, so that the space between the mold 12 and the substrate 1 is filled with the resin material 11 such that no gap is formed. The mold 12 has a pattern for forming the step portion 54, the surface 52, and the slope 56 on the first member 2.

Figure 6C:
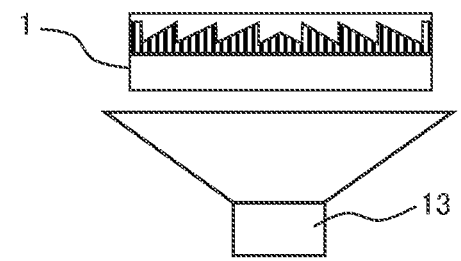
FIG. 6C is a diagram illustrating a stage in which the resin material is cured by irradiating the resin material with ultraviolet light.
Figure 6D:
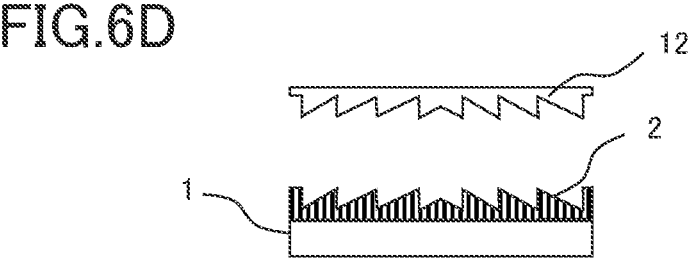
FIG. 6D is a diagram illustrating a stage in which the mold is separated from the resin material.

After the space between the mold 12 and the substrate 1 is filled with the resin material 11, the ultraviolet-curable resin material 11 is irradiated with ultraviolet light emitted from an ultraviolet light source 13, for curing the resin material 11, as illustrated in FIG. 6C. After the resin material 11 is irradiated with the ultraviolet light, the first member 2 that is in close contact with the substrate 1 is released from the mold 12, as illustrated in FIG. 6D. After that, the substrate 1 and the first member 2 may be set in an oven and heated for completely curing the resin material 11.

FIG. 8A is a partial cross-sectional view in which one portion of the first member 2 formed in the present embodiment is enlarged. A length (first distance) h1 by which the step portion 54 projects from the surface 52 in a direction orthogonal to the center line C is preferably equal to or larger than 5 µm and equal to or smaller than 50 µm. The process for applying the paint will be described below with reference to FIG. 7A. If the length h1 is smaller than 5 µm, the paint may flow over the step portion 54 and easily reach the slope 56 because the paint applied as a material of the light blocking portion 5 has a lower viscosity equal to or smaller than 1000 mPa·s (millipascal second). In contrast, if the length h1 is larger than 50 µm, the paint can be prevented from spreading on the slope 56. However, since the thickness t of the light blocking portion in the vicinity of the step portion 54 exceeds 50 µm, the optical performance of the louver will deteriorate. Preferably, the length L1 of the surface 52 (that forms the light blocking portion 5) in the optical-axis direction and the distance L5 between adjacent surfaces 52 are determined so that a value L1/L5 is equal to or larger than 1 and equal to or smaller than 2. In addition, it is preferable that the length L1 and a length L6 (first length) of the step portion 54 in the optical-axis direction be determined so that a value L6/L1 is equal to or larger than 5% and equal to or smaller than 20%.

After the first member 2 is formed, the light blocking portion is formed on the surface 52 of the first member 2. In a case where the louver illustrated in FIG. 3B is formed, the substrate 1 is rotated on a rotation axis that is equal to the center line C of the plurality of concentric circles having different diameters, and the material of the light blocking portion 5 is applied onto the first member 2 along the concentric circles by using a dispenser 14. With the dispenser 14 being tilted appropriately, the coating material for forming the light blocking portion can be applied onto the surface 52 alone, without being applied onto the slope 56. In a case where the louver illustrated in FIG. 3C is formed, the surface 52 may be scanned linearly with the dispenser 14.

Figure 8B:
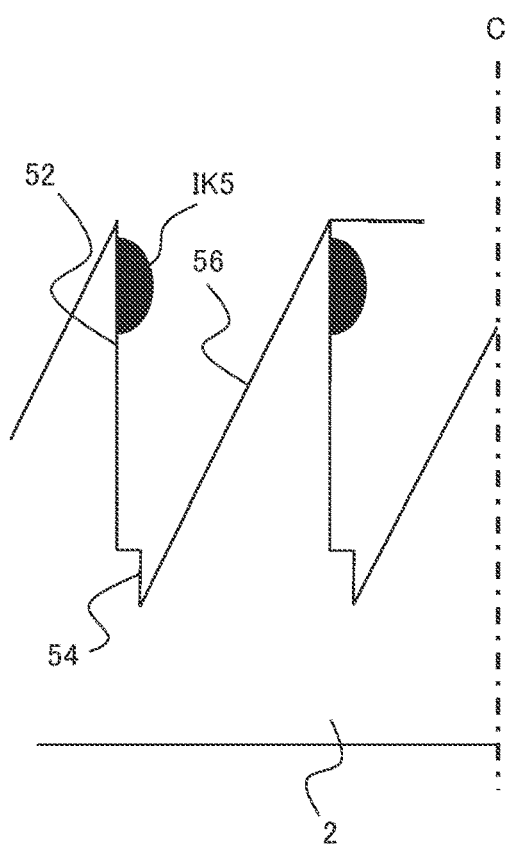
FIG. 8B is a diagram illustrating a state obtained immediately after paint IK5 is given onto the first member 2.

FIG. 8B illustrates a state obtained immediately after the paint IK5 is given onto the surface 52 by using the dispenser 14. The amount of the paint IK5 given onto the surface 52 is set so that when the paint IK5 spreads over the surface 52, the coating film has a predetermined thickness.

Figure 9A:
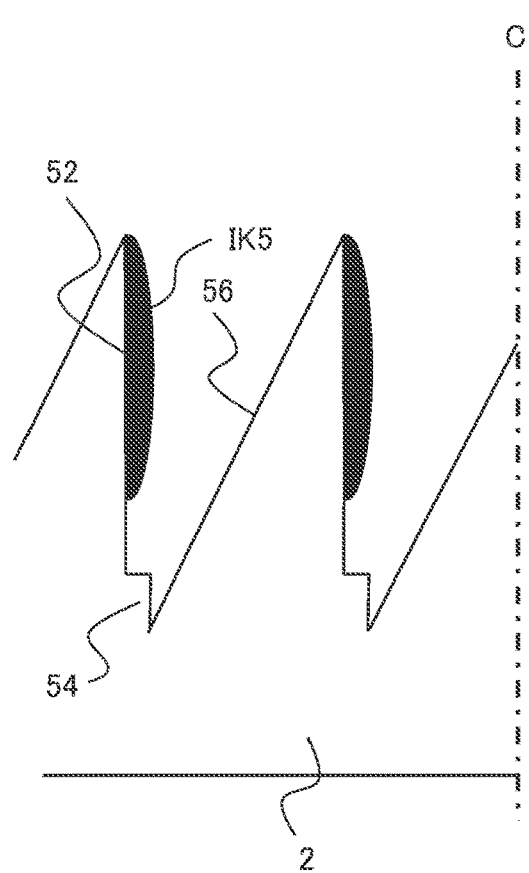
FIG. 9A is a diagram illustrating a state in which the paint IK5 is spreading along a surface 52.

In the present embodiment, since the paint IK5 has a viscosity equal to or smaller than 1000 mPa·s (millipascal second), the paint IK5 spreads downward along the surface 52, as illustrated in FIG. 9A.

Figure 9B:
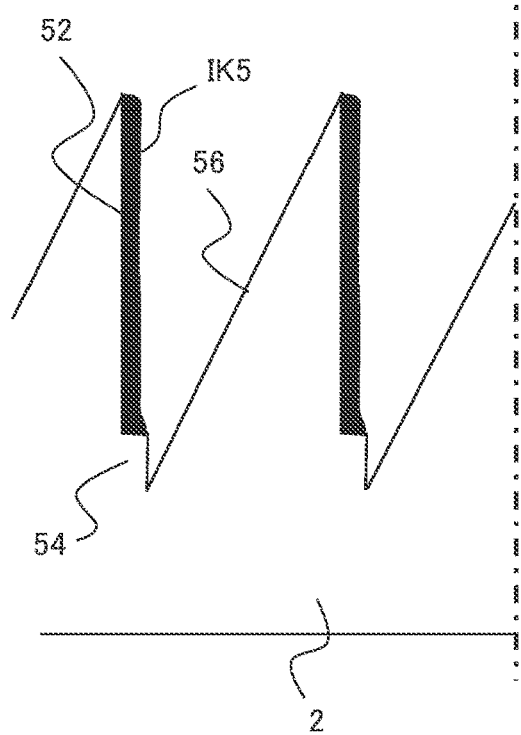
FIG. 9B is a diagram illustrating a state in which the leading edge of the paint IK5 contacts a step portion 54.

As illustrated in FIG. 9B, after the leading edge of the paint IK5 that has spread over the surface 52 contacts (abuts against) the step portion 54, the paint IK5 spreads from the contact point along the top surface of the step portion 54 toward a back direction or a front direction defined with respect to FIG. 9B. This is because the surface tension of the paint causes the force for spreading the paint along the top surface of the step portion 54 toward a back or front direction defined with respect to FIG. 9B, to become larger than the force for flowing the paint toward the slope 56 over the step portion 54. In this manner, the paint IK5 spreads over the whole of the surface 52. However, since the surface tension minimizes the surface area of the paint IK5, the paint IK5 does not flow over the step portion 54 and not spread on the slope 56. In addition, since the paint IK5 has a viscosity equal to or smaller than 1000 mPa·s (millipascal second), the coating film, formed by the paint IK5 having spread over the whole of the surface 52 has high uniformity in thickness.

After the paint IK5 is applied onto the surface 52, the substrate 1 and the first member 2 are heated and baked in an oven, for drying and curing the paint IK5. In this manner, the light blocking portion 5 is formed on the first member 2.

Figure 7A:
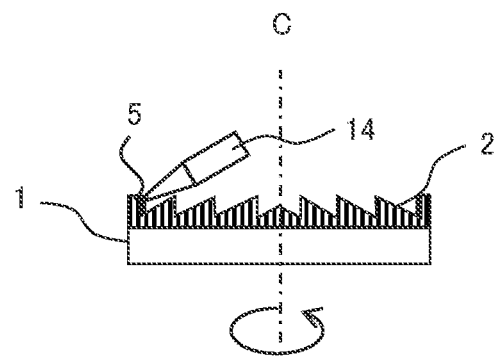
FIG. 7A is a diagram illustrating a stage in which a material of a light blocking portion is applied by using a dispenser in a method of manufacturing a louver of an embodiment.
Figure 7B:
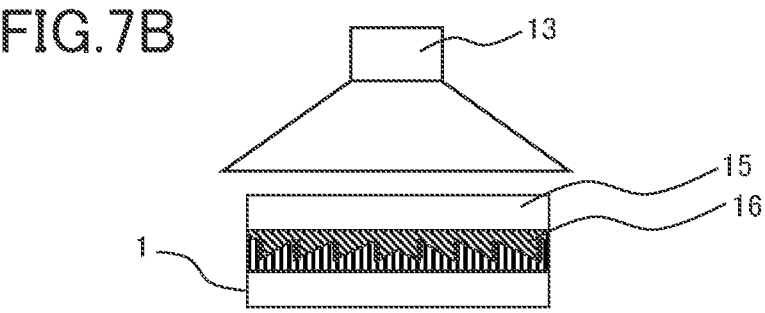
FIG. 7B is a diagram illustrating a stage in which a resin material is given for forming a second member and then the resin material is cured by irradiating the resin material with ultraviolet light through a mold plate.

Then, as illustrated in FIG. 7B, a proper amount of ultraviolet-curable resin material 16 is given onto the first member 2 on which the light blocking portion 5 is formed, for forming the second member 3. Then, the resin material 16 is pressed by using a mold plate 15 used for forming the shape of the second member 3 as a replica, so that the space between the mold plate 15 and the first member 2 on which the light blocking portion 5 is formed is filled with the resin material 16 such that no gap is formed. Note that the mold plate 15 is made of transparent material that transmits the ultraviolet light, and that a molding surface of the mold plate 15 that contacts the resin material 16 is a flat surface.

Figure 7C:
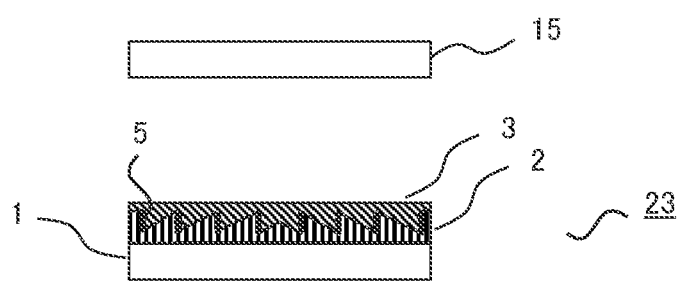
FIG. 7C is a diagram illustrating a stage in which the mold plate is separated from the resin material.

After the space between the mold plate 15 and the first member 2 is filled with the resin material 16, the ultraviolet-curable resin material 16 is irradiated with ultraviolet light emitted from an ultraviolet light source 13, for curing the resin material 16, as illustrated in FIG. 7B. After the resin material 16 is irradiated with the ultraviolet light, the substrate 1, the first member 2, and the second member 3 are released from the mold plate 15, as illustrated in FIG. 7C. After that, the substrate 1, the first member 2, and the second member 3 may be set in an oven and heated for completely curing the resin material 16.

By using the above-described manufacturing method, the louver 23 of the present embodiment having two layers that are in close contact with each other can be manufactured.

In the present embodiment, by forming the step portion 54, the light blocking portion 5 can be formed with high accuracy of shape. As a result, the louver used for a head mounted display and capable of suppressing the display properties from varying in the screen can be provided.

Note that although the description has been made for a case where the light blocking portion 5 is formed on the convex portion of the first member 2 disposed closer to the user's eye 24 (FIG. 1) and then the second member 3 disposed on the display panel 21 side is formed, the embodiments are not limited to this. For example, the step portion 54 may be formed on the second member 3 disposed on the display panel 21 side, then the light blocking portion 5 may be formed on the convex portion (i.e., the surface 53) of the second member 3, and then the first member 2 disposed closer to the user's eye 24 may be formed.

Second Embodiment

Hereinafter, a second embodiment will be described. Note that features of the present embodiment that are the same as those of the first embodiment will be omitted or described simply. For example, since the description made with reference to FIGS. 1 to 4 are the same as that for the second embodiment, the description will be omitted in the second embodiment. In the above-described first embodiment, the louver includes the louver body whose structure has been described with reference to FIG. 5A, and the light blocking portion is formed through the processes described with reference to FIGS. 8A to 9B. The present embodiment, however, differs from the first embodiment in the structure of the louver body and the processes through which the light blocking portion is formed. That is, as described below, in the present embodiment, the louver includes a louver body having a structure illustrated in FIG. 10, and the light blocking portion is formed through processes illustrated in FIGS. 11A to 12B.

Louver Body

Figure 10:
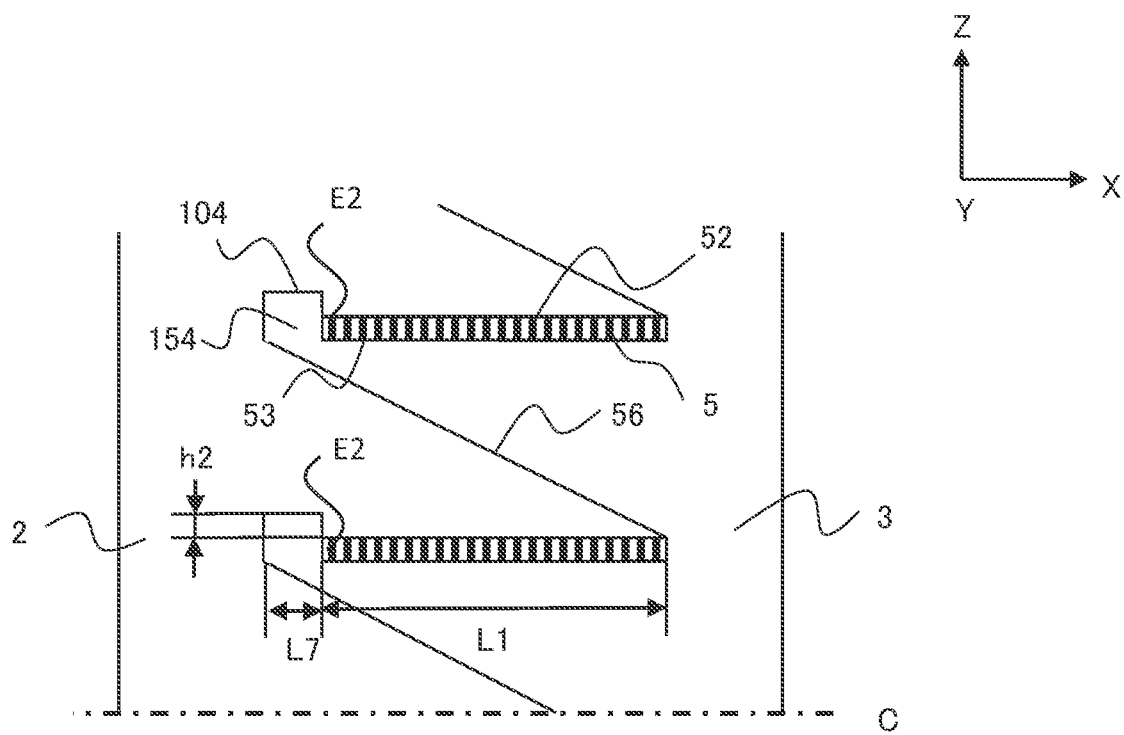
FIG. 10 is a partially enlarged cross-sectional view in which one portion of a louver body of a second embodiment is enlarged.

FIG. 10 is a partially enlarged cross-sectional view in which one portion of a cross section of a louver body of the present embodiment is enlarged. As in the first embodiment, the louver body includes a first member 2, a second member 3, and a plurality of light blocking portions 5. The concave and convex portions of the first member 2 and the concave and convex portions of the second member 3 join with each other, with the light blocking portions 5 being interposed between the first member 2 and the second member 3; and the first member 2 and the second member 3 are integrated with each other. In the present embodiment, the first member 2 is in contact with the main surface 5B of the light blocking portion 5, and the second member 3 is in contact with the main surface 5A, the end surface 5C, and the end surface 5D of the light blocking portion 5.

In the above-described first embodiment, as illustrated in FIG. 5A, the step portion 54 is formed on the first member 2; and the step portion 54 is formed continuous with the surface 52, and projects from the surface 52 toward the center line C. In the present embodiment, however, such a step portion is not formed.

Figure 11A:
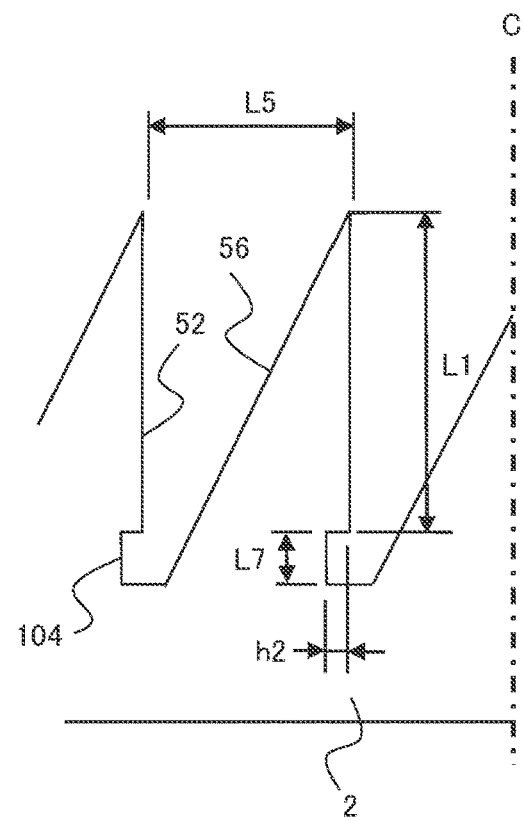
FIG. 11A is a partial cross-sectional view in which one portion of a first member 2 of the second embodiment is enlarged.

As illustrated in FIGS. 10 and 11A, in the present embodiment, a concave portion 104 is formed in the first member 2. The concave portion 104 is formed continuous with the surface 52, and is retracted from the surface 52 toward a direction opposite to the center line C. The shape and effect of the concave portion 104 will be described below. In the present embodiment, an end portion E2 (i.e., the end surface 5C) of the light blocking portion 5 is formed along an edge of the concave portion 104 even if the concave portion 104 and the end portion E1 are viewed in a different position in the Y direction (that is, even if the concave portion 104 and the end portion E1 are viewed in a different cross-sectional view in the Y direction). In other words, the shape of the end portion E2 of the light blocking portion 5 is defined by the edge of the concave portion 104. Thus, unlike the edge portion ED illustrated in FIG. 18B, the end portion E2 of the light blocking portion 5 has no irregular-wave shape. Since the concave portion 104 has a desired shape formed with high accuracy through molding as described below, the shape of the light blocking portion 5 can be controlled with high accuracy. Thus, the present embodiment can provide a louver used for a head mounted display and having light blocking portions whose shape is formed with high accuracy.

Method of Manufacturing Louver

As in the first embodiment, the louver of the present embodiment is also manufactured through the processes illustrated in FIGS. 6A to 6D, and 7A to 7C.

In the present embodiment, however, the shape of the first member 2 formed through the processes illustrated in FIGS. 6A to 6D differs from the shape of the first member 2 of the first embodiment, as described above.

FIG. 11A is a partial cross-sectional view in which one portion of the first member 2 formed in the present embodiment is enlarged. A length (first distance) h2 by which the concave portion 104 is retracted from the surface 52 in a direction orthogonal to the center line C is preferably equal to or larger than 5 μm and equal to or smaller than 50 μm. The paint for the light blocking portion 5, applied in the process illustrated in FIG. 7A, has a lower viscosity equal to or smaller than 1000 mPa·s (millipascal second). However, the paint is prevented by the surface tension of the paint, from flowing over the edge (corner portion) of the concave portion 104 (that is, prevented from spreading on the concave portion 104), as described below. If the length h2 is smaller than 5 the shape of the edge (corner portion) of the concave portion 104 is easily rounded when the first member 2 is molded, and thus the paint will easily flow over the edge (corner portion) and reach the interior of the concave portion 104. In addition, if the length h2 is larger than 50 the depth of the concave portion 104 is made larger. As a result, the concave portion 104 is not completely filled with the resin material 16 in the process of FIG. 7B for forming the second member 3, and air bubbles are easily left in the concave portion 104.

Preferably, a length L1 of the surface 52 (on which the light blocking portion 5 is formed) in the optical-axis direction and a distance L5 between adjacent surfaces 52 are determined so that a value L1/L5 is equal to or larger than 1 and equal to or smaller than 2. In addition, it is preferable that the length L1 and a length L7 (first length) of the concave portion 104 in the optical-axis direction be determined so that a value L7/L1 is equal to or larger than 5% and equal to or smaller than 20%.

Next, a procedure for forming the light blocking portion on the surface 52 of the first member 2 will be described. In a case where the louver illustrated in FIG. 3B is formed, the substrate 1 is rotated on a rotation axis that is equal to the center line C of the plurality of concentric circles having different diameters, and the material of the light blocking portion 5 is applied onto the first member 2 along the concentric-circle surface 52 by using a dispenser 14. With the dispenser 14 being tilted appropriately, the coating material for forming the light blocking portion can be applied onto the surface 52 alone, without being applied onto the slope 56. In a case where the louver illustrated in FIG. 3C is formed, the surface 52 may be scanned linearly with the dispenser 14.

Figure 11B:
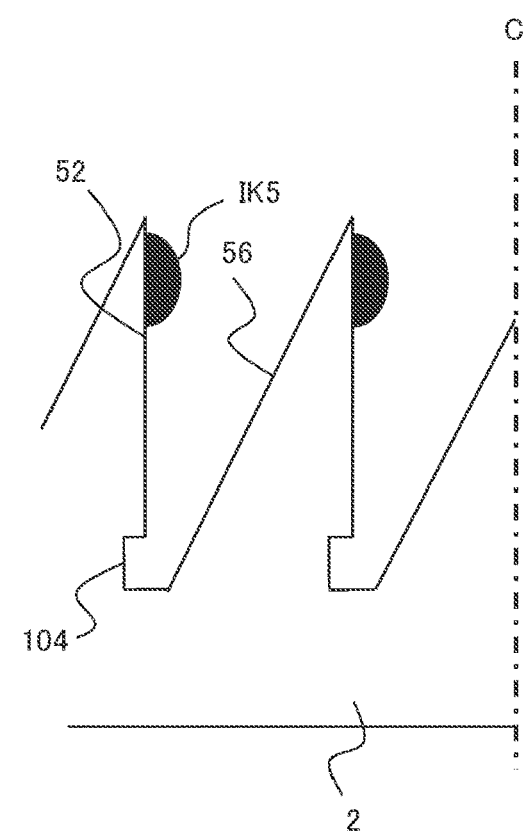
FIG. 11B is a diagram illustrating a state obtained immediately after paint IK5 is given onto the first member 2.

FIG. 11B illustrates a state obtained immediately after the paint IK5 is given onto the surface 52 by using the dispenser 14. The amount of the paint IK5 given onto the surface 52 is set so that when the paint IK5 spreads over the surface 52, the coating film has a predetermined thickness.

Figure 12A:
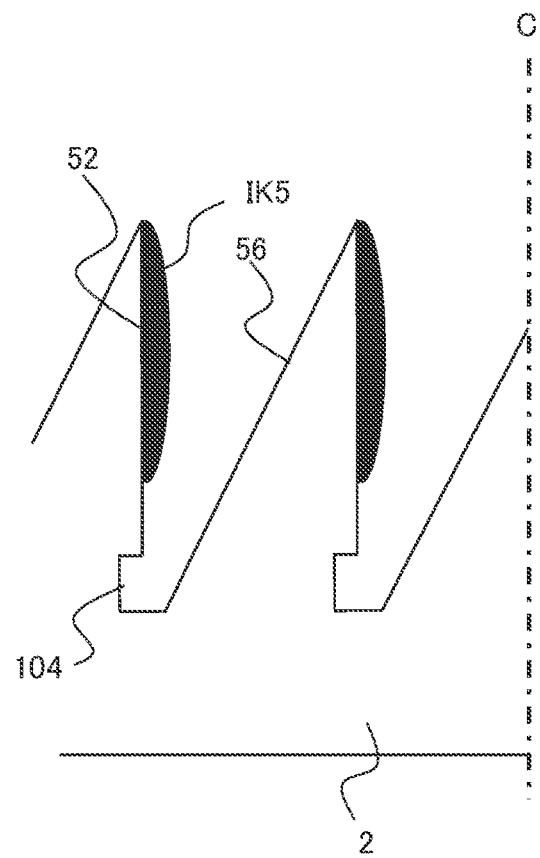
FIG. 12A is a diagram illustrating a state in which the paint IK5 is spreading along a surface 52.

In the present embodiment, since the paint IK5 has a viscosity equal to or smaller than 1000 mPa s (millipascal second), the paint IK5 spreads downward along the surface 52, as illustrated in FIG. 12A.

Figure 12B:
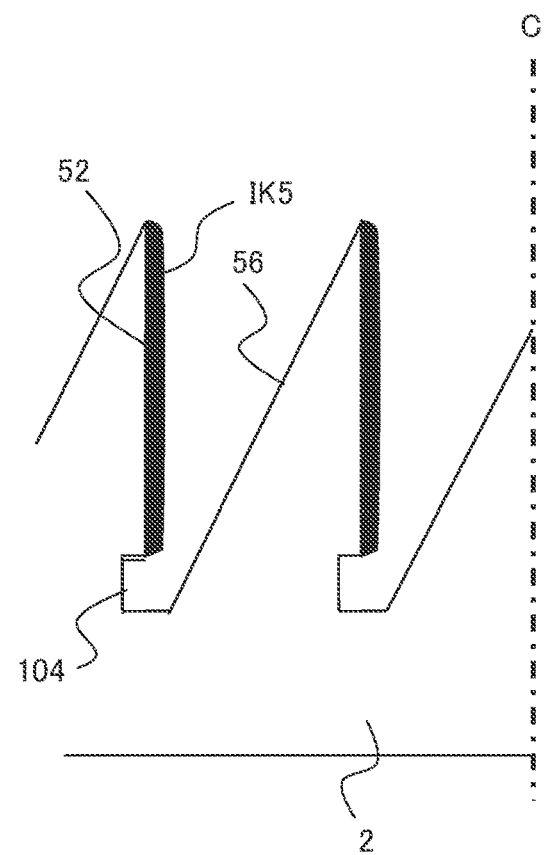
FIG. 12B is a diagram illustrating a state in which the leading edge of the paint IK5 reaches an edge (corner portion) of a concave portion 104.

As illustrated in FIG. 12B, after the leading edge of the paint IK5 that has spread downward over the surface 52 reaches the edge (corner portion) of the concave portion 104, the paint IK5 spreads from the point, to which the leading edge of the paint IK5 has reached, along the edge (corner portion) of the concave portion 104 toward a back or front direction defined with respect to FIG. 12B. This is because the surface tension of the paint causes the force for spreading the paint along the edge (corner portion) of the concave portion 104 toward a back or front direction defined with respect to FIG. 12B, to become larger than the force for flowing the paint into the interior of the concave portion 104. In this manner, the paint IK5 spreads over the whole of the surface 52. However, since the surface tension minimizes the surface area of the paint IK5, the paint IK5 does not flow over the edge (corner portion) of the concave portion 104 and not spread on the slope 56. In addition, since the paint IK5 has a viscosity equal to or smaller than 1000 mPa·s (millipascal second), the coating film, formed by the paint IK5 having spread over the whole of the surface 52, has high uniformity in thickness.

After the paint IK5 is applied onto the surface 52, the substrate 1 and the first member 2 are heated and baked in an oven, for drying and curing the paint IK5. In this manner, the light blocking portion 5 is formed on the first member 2.

The manufacturing procedure performed after the light blocking portion 5 is formed on the first member 2 is the same as that of the first embodiment.

In the present embodiment, by forming the concave portion 104, the light blocking portion 5 can be formed with high accuracy of shape. As a result, the louver used for a head mounted display and capable of suppressing the display properties, such as brightness, from varying in the screen can be provided.

Note that although the description has been made for a case where the light blocking portion 5 is formed on the convex portion of the first member 2 disposed closer to the user's eye 24 (FIG. 1) and then the second member 3 disposed on the display panel 21 side is formed, the embodiments are not limited to this. For example, the concave portion 104 may be formed on the second member 3 disposed on the display panel 21 side, then the light blocking portion 5 may be formed on the convex portion (i.e., the surface 53) of the second member 3, and then the first member 2 disposed closer to the user's eye 24 may be formed.

Third Embodiment

Hereinafter, a third embodiment will be described. Note that features of the present embodiment that are the same as those of the first embodiment will be omitted or described simply. For example, since the description made with reference to FIGS. 1 to 4 are the same as that for the third embodiment, the description will be omitted in the third embodiment. In the above-described first embodiment, the louver includes the louver body whose structure has been described with reference to FIG. 5A, and the light blocking portion is formed through the processes described with reference to FIGS. 8A to 9B. The present embodiment, however, differs from the first embodiment in the structure of the louver body and the processes through which the light blocking portion is formed. That is, as described below, in the present embodiment, the louver includes a louver body having a structure illustrated in FIG. 13, and the light blocking portion is formed through processes illustrated in FIGS. 14A to 15B.

Louver Body

Figure 13:
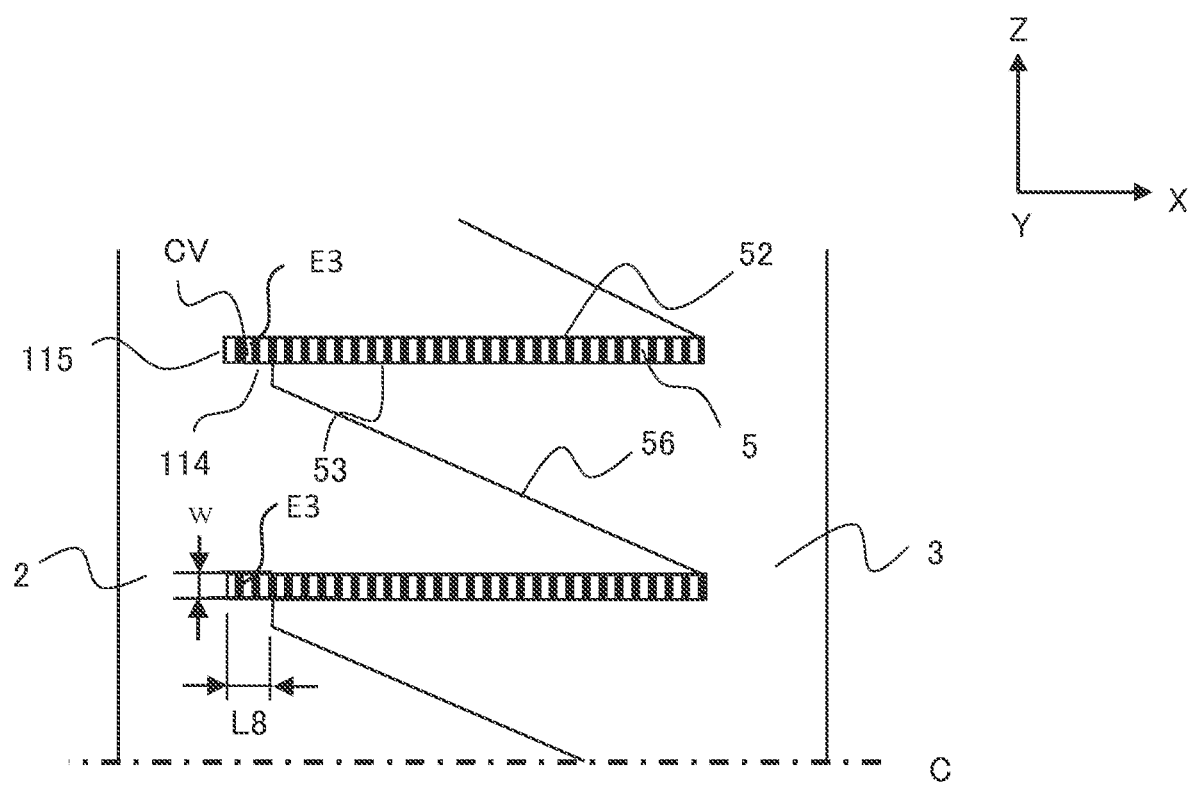
FIG. 13 is a partially enlarged cross-sectional view in which one portion of a louver body of a third embodiment is enlarged.

FIG. 13 is a partially enlarged cross-sectional view in which one portion of a cross section of a louver body of the present embodiment is enlarged. As in the first embodiment, the louver body includes a first member 2, a second member 3, and light blocking portions 5. The concave and convex portions of the first member 2 and the concave and convex portions of the second member 3 join with each other, with the light blocking portions 5 being interposed between the first member 2 and the second member 3; and the first member 2 and the second member 3 are integrated with each other. In the present embodiment, the first member 2 is in contact with the main surface 5B, the end surface 5C, and one portion of the main surface 5A of the light blocking portion 5, and the second member 3 is in contact with the other portion of the main surface 5A, and the end surface 5D of the light blocking portion 5.

In the above-described first embodiment, as illustrated in FIG. 5A, the step portion 54 is formed on the first member 2; and the step portion 54 is formed continuous with the surface 52, and projects from the surface 52 toward the center line C. In the present embodiment, however, such a step portion is not formed.

Figure 14A:
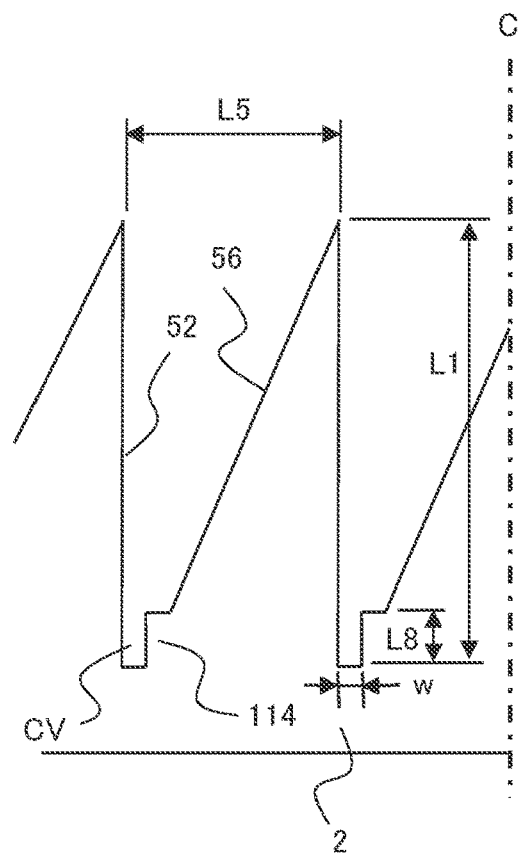
FIG. 14A is a partial cross-sectional view in which one portion of a first member 2 of the third embodiment is enlarged.

As illustrated in FIGS. 13 and 14A, in the present embodiment, a convex portion 114 is formed on the first member 2. The convex portion 114 is formed continuous with a slope 56, and projects from the slope 56 toward a direction opposite to the center line C, so as to face the surface 52. In other words, since the convex portion 114 is formed on the first member 2, a concave portion CV is formed in the first member 2.

The shape and effect of the concave portion CV will be described below. In the present embodiment, an end portion E3 of the light blocking portion 5 is formed so as to fill the concave portion CV even if the concave portion CV and the end portion E3 are viewed in a different position in the Y direction (that is, even if the concave portion CV and the end portion E3 are viewed in a different cross-sectional view in the Y direction). In other words, the shape of the end portion E3 of the light blocking portion 5 is defined by the concave portion CV. Thus, unlike the edge portion ED illustrated in FIG. 18B, the end portion E3 of the light blocking portion 5 has no irregular-wave shape. Since the concave portion CV has a desired shape formed with high accuracy through molding as described below, the shape of the light blocking portion 5 can be controlled with high accuracy. Thus, the present embodiment can provide a louver used for a head mounted display and having light blocking portions whose shape is formed with high accuracy.

Method of Manufacturing Louver

As in the first embodiment, the louver of the present embodiment is also manufactured through the processes illustrated in FIGS. 6A to 6D, and 7A to 7C.

In the present embodiment, however, the shape of the first member 2 formed through the processes illustrated in FIGS. 6A to 6D differs from the shape of the first member 2 of the first embodiment, as described above.

FIG. 14A is a partial cross-sectional view in which one portion of the first member 2 formed in the present embodiment is enlarged. A width w of a cross section of the concave portion CV in a direction orthogonal to the center line C is preferably equal to or larger than 5 μm and equal to or smaller than 50 μm. The paint for the light blocking portion 5, applied in the process illustrated in FIG. 7A, has a lower viscosity equal to or smaller than 1000 mPa·s (millipascal second). However, the paint is uniformly drawn into the concave portion CV by using the capillary phenomenon, as described below. If the width w is smaller than 5 it becomes difficult to achieve the high accuracy of shape of the concave portion CV when the first member 2 is formed, and the long and narrow concave portion cannot be formed stably. In addition, if the width w is larger than 50 μm, the capillary force will not be fully applied, and it becomes difficult to fill the whole of the interior of the concave portion CV, with the paint.

Preferably, a length L1 of the surface 52 (that forms the light blocking portion 5) in the optical-axis direction and a distance L5 between adjacent surfaces 52 are determined so that a value L1/L5 is equal to or larger than 1 and equal to or smaller than 2. In addition, it is preferable that the length L1 and a length L8 (first length) of the concave portion CV in the optical-axis direction be determined so that a value L8/L1 is equal to or larger than 5% and equal to or smaller than 20%. Furthermore, it is preferable that the length L8 and a width w of a cross section of the concave portion CV be determined so that a value L8/w is equal to or larger than 1 and equal to or smaller than 2.

Next, a procedure for forming the light blocking portion on the surface 52 of the first member 2 will be described. In a case where the louver illustrated in FIG. 3B is formed, the substrate 1 is rotated on a rotation axis that is equal to the center line C of the plurality of concentric circles having different diameters, and the material of the light blocking portion 5 is applied onto the first member 2 along the concentric-circle surface 52 by using a dispenser 14. With the dispenser 14 being tilted appropriately, the coating material for forming the light blocking portion can be applied onto the surface 52 alone, without being applied onto the slope 56. In a case where the louver illustrated in FIG. 3C is formed, the surface 52 may be scanned linearly with the dispenser 14.

Figure 14B:
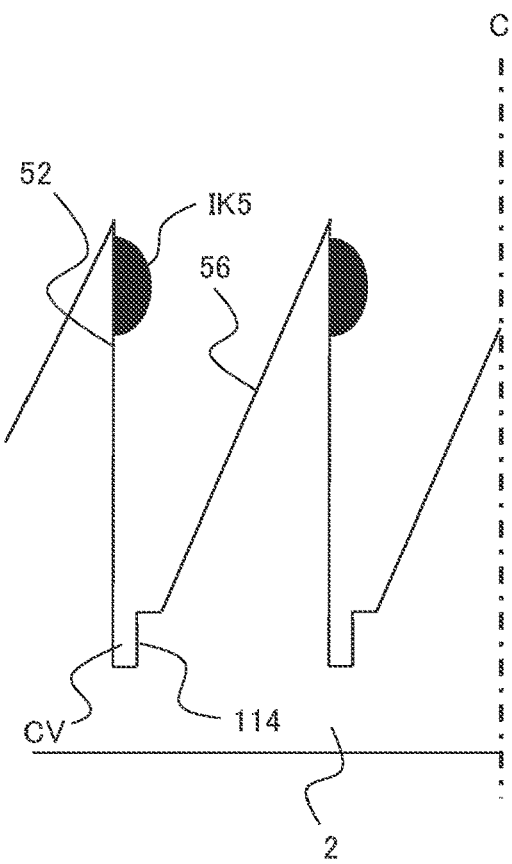
FIG. 14B is a diagram illustrating a state obtained immediately after paint IK5 is given onto the first member 2.

FIG. 14B illustrates a state obtained immediately after the paint IK5 is given onto the surface 52 by using the dispenser 14. The amount of the paint IK5 given onto the surface 52 is set so that when the paint IK5 spreads over the surface 52, the coating film has a predetermined thickness.

Figure 15A:
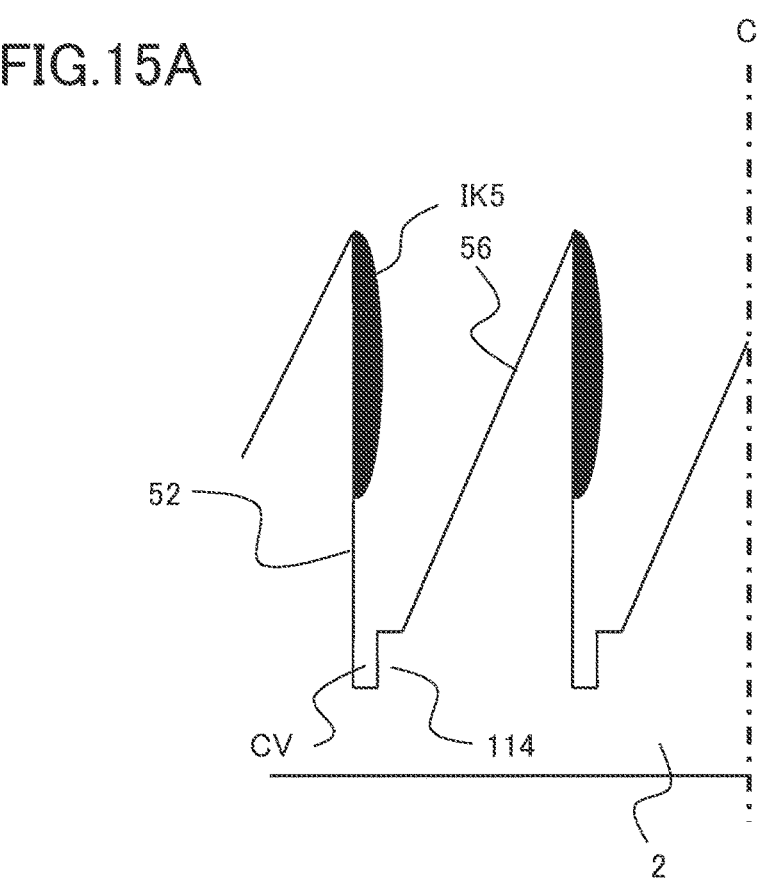
FIG. 15A is a diagram illustrating a state in which the paint IK5 is spreading along a surface 52.

In the present embodiment, since the paint IK5 has a viscosity equal to or smaller than 1000 mPa·s (millipascal second), the paint IK5 spreads downward along the surface 52, as illustrated in FIG. 15A.

Figure 15B:
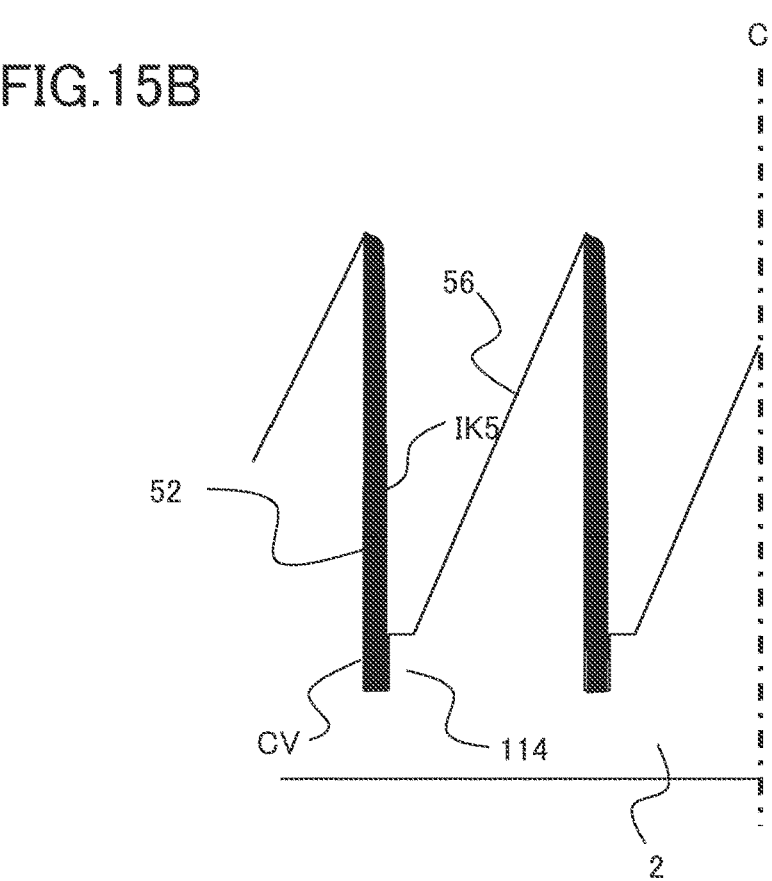
FIG. 15B is a diagram illustrating a state in which the leading edge of the paint IK5 reaches a concave portion CV and is sucked into the concave portion CV.

As illustrated in FIG. 15B, when the leading edge of the paint IK5 that has spread downward over the surface 52 reaches the concave portion CV, the paint IK5 is sucked into the concave portion CV by the capillary force. Then, the paint IK5 spreads over the concave portion CV in a back or front direction defined with respect to FIG. 15B, so as to fill the whole of the interior of the concave portion CV. This is because the capillary force for sucking the paint into the concave portion CV becomes larger than the force for flowing the paint over the convex portion 114 toward the slope 56. In this manner, the paint IK5 spreads over the whole of the surface 52. Since the paint IK5 has a viscosity equal to or smaller than 1000 mPa·s (millipascal second), the coating film, formed by the paint IK5 having spread over the whole of the surface 52, has high uniformity in thickness.

After the paint IK5 is applied onto the surface 52, the substrate 1 and the first member 2 are heated and baked in an oven, for drying and curing the paint IK5. In this manner, the light blocking portion 5 is formed on the first member 2.

The manufacturing procedure performed after the light blocking portion 5 is formed on the first member 2 is the same as that of the first embodiment.

In the present embodiment, by forming the concave portion CV, the light blocking portion 5 can be formed with high accuracy of shape. As a result, the louver used for a head mounted display and capable of suppressing the display properties from varying in the screen can be provided.

Note that although the description has been made for a case where the light blocking portion 5 is formed on the convex portion of the first member 2 disposed closer to the user's eye 24 (FIG. 1) and then the second member 3 disposed on the display panel 21 side is formed, the embodiments are not limited to this. For example, the concave portion CV may be formed on the second member 3 disposed on the display panel 21 side, then the light blocking portion 5 may be formed on the convex portion (i.e., the surface 53) of the second member 3, and then the first member 2 disposed closer to the user's eye 24 may be formed.

EXAMPLES

Hereinafter, specific examples and a comparative example will be described.

Examples 1 to 3

Examples 1 to 3 of the first embodiment were made by using a below-described manufacturing method, and undesired display light and undesired external light were evaluated. The substrate 1 used was a disk-shaped planar optical glass (S-BSL7 made by OHARA INC.) that contains boron and silicon. The size φ of the substrate 1 was 45 mm. The mold 12 used for forming the concave and convex portions on the first member 2 was made by cutting a NiP layer plated on a base metal material, by using a precision machine tool, and forming a desired shape of the surface of the mold 12 that is to be inverted into the shape of the concave and convex portions of the first member 2. When the mold 12 was made, a step portion whose shape was to be inverted into the shape of the step portion 54 that projects from the surface 52 was also formed. The length h1 by which the step portion 54 projects from the surface 52 was 5 μm in Example 1, 25 μm in Example 2, and 50 μm in Example 3. The value L1/L5 was 1 in Example 1, 1.5 in Example 2, and 2 in Example 3. The value L6/L1 was 5% in Example 1, 10% in Example 2, and 20% in Example 3.

The first member 2 and the second member 3 were formed in this order, on one main surface of the substrate 1. The first member 2 was made by using an ultraviolet-curable acrylic-resin compound. The light blocking portion was made by applying the coating material of the light blocking portion onto the first member 2 by using a dispenser, from an oblique direction, while the substrate 1 was rotated on the center of rotation that is the center of the concentric circles of the first member 2. The dispenser was used because the dispenser can inject a proper amount of coating material for forming a film having a thickness of about 10 μm, and because the number (e.g., about 20) of the concentric circles formed per one substrate and coated with the coating material is small. In addition, the use of dispenser is convenient for processes performed before and after the coating process. Then, the substrate 1 and the first member 2 were set in an oven that was set at 80° C., and heated and dried for four hours.

The shape of the light blocking portions in a plan view is concentric. The distance L5 between adjacent light blocking portions (or the difference between radii of adjacent concentric circles) was set at 1 mm.

Then, the second member 3 was made by using the mold plate 15 and the ultraviolet-curable acrylic-resin compound, which is the same material as that of the first member 2, and the louver element having two layers that are in close contact with each other was completed.

Examples 4 to 6

In Examples 4 to 6 of the second embodiment, the louver was made by using the same method as that for Examples 1 to 3 except that the mold 12 for forming the concave portion 104 retracted from the surface 52 was used, and that ultraviolet-curable silicon was used for forming the first member 2 and the second member 3. The reason that the ultraviolet-curable silicon was used for the first member 2 and the second member 3 is to easily release the mold when the concave portion 104 is formed.

The length h2 by which the concave portion 104 is retracted from the surface 52 was 5 μm in Example 4, 25 μm in Example 5, and 50 μm in Example 6. The value L1/L5 was 1 in Example 4, 1.5 in Example 5, and 2 in Example 6. The value L7/L1 was 5% in Example 4, 10% in Example 5, and 20% in Example 6.

Examples 7 to 9

In Examples 7 to 9 of the third embodiment, the louver was made by using the same method as that for Examples 1 to 3 except that the mold 12 for forming the concave portion CV and the convex portion 114 was used. The width of the concave portion CV was 5 μm in Example 7, 25 μm in Example 8, and 50 μm in Example 9. In addition, the value L1/L5 was 1 in Example 7, 1.5 in Example 8, and 2 in Example 9. The value L8/w was 1 in Example 7, 1.5 in Example 8, and 2 in Example 9.

Comparative Example 1

In Comparative Example 1, the louver illustrated in FIG. 18B was made by using the method described in Japanese Patent Application Publication No. 2009-186879.
Evaluation Method The louver elements of the examples and the comparative example were measured and evaluated by using the below-described method.
Evaluation of Undesired Display Light The intensity of undesired light caused by the display light was evaluated by using the below-described method. A head mounted display in which a louver element to be evaluated had been mounted was set in a darkroom in which the head mounted display is not affected by the external light. In addition, a digital camera for capturing the display light from an image displayed on the head mounted display was set in the dark room, at a position that corresponds to a position of a user's eye. Then, a chart in which black-and-white solid squares, each having sides of 1 mm, were arranged like a lattice, was displayed on the head mounted display, and the image of the chart was captured by the digital camera. The ratio of the white-color display portions to the black-color display portions, based on data, was 1:1. The light-intensity average value of five white-color display portions of the image captured by the digital camera was determined as an intensity of white-color display portion, and the light-intensity average value of five black-color display portions of the image captured by the digital camera was determined as an intensity of black-color display portion.

If the ratio of the intensity of black-color display portion of display light to the intensity of white-color display portion of display light was equal to or smaller than 0.01, the sample was evaluated as "A". In contrast, if the ratio of the intensity of black-color display portion of display light to the intensity of white-color display portion of display light was larger than 0.01, the sample was evaluated as "B".
Evaluation of Undesired External Light The intensity of undesired light caused by the external light was evaluated by using the below-described method. A head mounted display in which a louver element to be evaluated had been mounted was set in a darkroom in which the head mounted display is not affected by the external light. In addition, a digital camera for capturing an image of a display portion of the head mounted display was set in the dark room, at a position that corresponds to a position of a user's eye. Then, the louver element was irradiated with white parallel light having a diameter of 5 mm and serving as external light, by using an LED lamp. The white parallel light was emitted from six directions. The six directions were defined such that three directions inclined by 45°, 60°, and 75° with respect to a Y-Z plane of the louver element were defined, and that the three angles were defined in two directions: an upper direction extending from the rear viewed from a user, and a lateral direction extending from the rear viewed from a user. In addition, the louver was irradiated with the white parallel light at three positions: a center C of the louver, a midpoint between the center C and an outer circumferential edge of the louver in the upward direction Z, and a midpoint between the center C and an outer circumferential edge of the louver in the sideward direction Y. Thus, the number of conditions on directions and positions of the irradiation are 18 in total. In addition, the intensity of the white parallel light per unit area was set 100 times larger than the intensity of the light from the white-color display portions of the head mounted display. Then, a white screen image was displayed on the head mounted display, and the light-intensity average value of five white-color display portions of an image captured by the digital camera was determined as an intensity of white-color display portion. After that, the head mounted display was caused to display nothing, and the white parallel light that serves as the external light was emitted to the louver element under the above-described 18 conditions. Then, the light-intensity average value of an image of a full screen of the head mounted display was determined as an intensity of undesired external light.

If the ratio of the intensity of undesired external light to the intensity of white-color display portion of display light was equal to or smaller than 0.01, the sample was evaluated as "A". In contrast, if the ratio of the intensity of undesired external light to the intensity of white-color display portion of display light was larger than 0.01, the sample was evaluated as "B".

Table 1 illustrates evaluation results on the undesired display light and the undesired external light, obtained in Examples 1 to 9 and Comparative Example 1.

Evaluation

Figure 16:
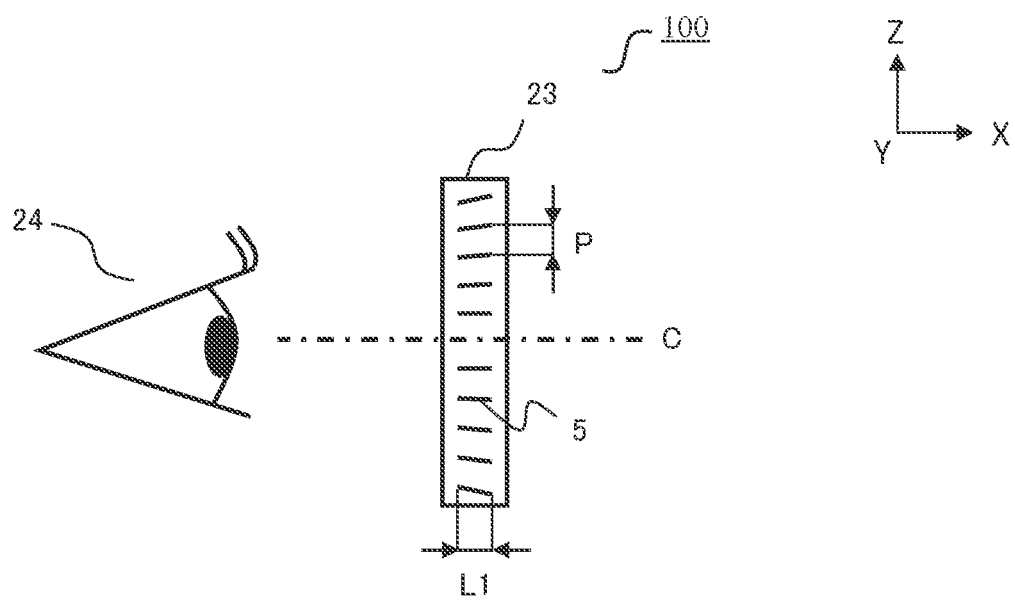
FIG. 16 is a schematic cross-sectional view illustrating an embodiment in which the slopes of main surfaces of light blocking portions 5 vary.
Figure 17:
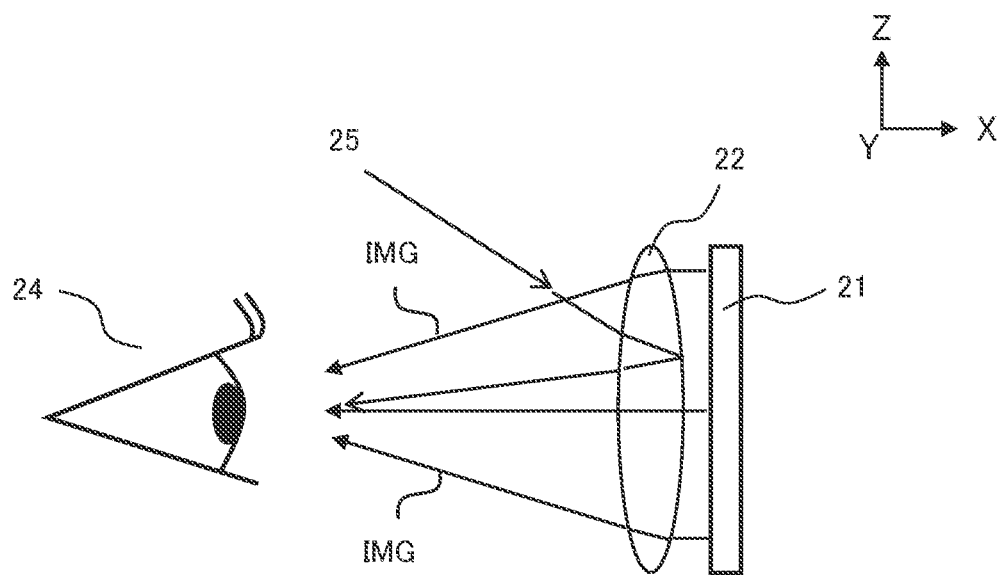
FIG. 17 is a schematic diagram illustrating a conventional head mounted display.

In the louver elements of Examples 1 to 9, the distance h1, the distance h2, the width w, and values L1/L5, L6/L1, L7/L1, and L8/w are set within the below-described respective ranges. As can be seen from Table 1, the louver elements can reduce the undesired light caused by the reflection of display light, and the undesired light caused by the scattering of external light; and thereby can reduce the deterioration of images.

distance h1: 5 μm or more and 50 μm or less
distance h2: 5 μm or more and 50 μm or less
width w: 5 μm or more and 50 μm or less
L1/L5: 1 or more and 2 or less
L6/L1: 5% or more and 20% or less
L7/L1: 5% or more and 20% or less
L8/w: 1 or more and 2 or less Other Embodiments The present invention is not limited to the above-described embodiments and examples, and can be variously modified within the technical concept of the present invention. For example, the shape of the light blocking portion 5 is not limited to the shape illustrated as an example in FIG. 1, and may be modified as appropriate in accordance with the angle of view, which is determined by the display panel 21 and the optical element 22. For example, as in FIG. 16 that illustrates a cross section, the slope of the main surface of the light blocking portion 5 may be changed more as the main surface is separated more from the center line C of the louver 23.

In addition, the shape of the light blocking portion 5 in a plan view is not limited to the shape of the plurality of concentric circles illustrated in FIG. 3B and the shape of stripes as illustrated in FIG. 3C. The shape of the light blocking portion 5 in a plan view may be a shape of arcs of a plurality of concentric circles having different diameters, or a shape of a plurality of ellipses or polygons.

The louver of the present invention may be mounted in another optical apparatus other than the head mounted display. Examples of the other optical apparatus include a hand-held display, a camera that captures still and/or moving images, a microscope, and an endoscope. The present dis-

TABLE 1

| | SHAPE OF LIGHT BLOCKING PORTION OF LOUVER ELEMENT | | | | | | EVALUATION | | | |
|---|---|---|---|---|---|---|---|---|---|---|
| | DISTANCE h1, h2 (μm) | WIDTH w (μm) | PITCH L5 (mm) | L1/L5 (TIMES) | L6/L1 L7/L1 (%) | L8/w (TIMES) | UNDESIRED DISPLAY LIGHT | | UNDESIRED EXTERNAL LIGHT | |
| EXAMPLE 1 | 5 (PROJECTION) | — | 1 | 1 | 5 | — | A | 0.006 | A | 0.009 |
| EXAMPLE 2 | 25 (PROJECTION) | — | 1 | 1.5 | 10 | — | A | 0.007 | A | 0.007 |
| EXAMPLE 3 | 50 (PROJECTION) | — | 1 | 2 | 20 | — | A | 0.005 | A | 0.004 |
| EXAMPLE 4 | 5 (CONCAVE) | — | 1 | 1 | 5 | — | A | 0.005 | A | 0.008 |
| EXAMPLE 5 | 25 (CONCAVE) | — | 1 | 1.5 | 10 | — | A | 0.007 | A | 0.006 |
| EXAMPLE 6 | 50 (CONCAVE) | — | 1 | 2 | 20 | — | A | 0.006 | A | 0.006 |
| EXAMPLE 7 | NONE | 5 | 1 | 1 | — | 1 | A | 0.006 | A | 0.009 |
| EXAMPLE 8 | NONE | 25 | 1 | 1.5 | — | 1.5 | A | 0.007 | A | 0.005 |
| EXAMPLE 9 | NONE | 50 | 1 | 2 | — | 2 | A | 0.005 | A | 0.005 |
| COMPARATIVE EXAMPLE 1 | NONE | NONE | 1 | 2 | 0 | NONE | A | 0.007 | B | 0.021 | closure can provide a louver used for a head mounted display and capable of suppressing the display properties from varying in the screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-170246, filed Oct. 18, 2021, which is hereby incorporated by reference herein in its entirety.

What is claimed is:

1. A louver comprising:
a first member made of transparent material;
a second member made of transparent material; and
a plurality of light blocking portions made of light blocking material,
wherein the first member and the second member are configured to join with each other, with the plurality of light blocking portions being interposed between the first member and the second member,
wherein a first main surface of each of the plurality of light blocking portions is in contact with the first member and a second main surface of each of the light blocking portions is in contact with the second member,
wherein the first member includes convex portions, each of the convex portions being configured to (a) project from the first main surface of one of the plurality of light blocking portions toward a center line of the louver by a first distance and (b) have a first length along the center line, and
wherein one end surface of each of the plurality of light blocking portions in a direction along the center line is in contact with one of the convex portions, and another end surface of the each of the plurality of light blocking portions is in contact with the second member.

2. The louver according to claim 1, wherein the first distance is equal to or larger than 5 μm and equal to or smaller than 50 μm.

3. The louver according to claim 1, wherein L1/L5 is equal to or larger than 1 and equal to or smaller than 2, where L1 is a length of each of the plurality of light blocking portions along the center line, and L5 is a distance by which adjacent light blocking portions of the plurality of light blocking portions are separated from each other in a direction orthogonal to the center line.

4. The louver according to claim 1, wherein the first length is equal to or larger than 5% of L1 and equal to or smaller than 20% of L1, where L1 is a length of each of the plurality of light blocking portions along the center line.

5. A head mounted display comprising:
a display panel;
a condensing optical portion configured to condense display light emitted from the display panel; and
the louver according to claim 1,
wherein the louver is disposed in an optical-path space in which an optical path of the display light that travels from the condensing optical portion toward a user's eye is formed.

6. An optical apparatus comprising:
a housing; and
the louver according to claim 1 and disposed in the housing.

7. A louver comprising:
a first member made of transparent material;
a second member made of transparent material; and
a plurality of light blocking portions made of light blocking material,
wherein the first member and the second member are configured to join with each other, with the plurality of light blocking portions being interposed between the first member and the second member,
wherein a first main surface of each of the plurality of light blocking portions is in contact with the first member and a second main surface of each of the light blocking portions is in contact with the second member,
wherein the first member includes concave portions, each of the concave portions being configured to be retracted from the first main surface of one of the plurality of light blocking portions toward a direction opposite to a center line of the louver by a first distance and have a first length along the center line, and
wherein one end portion of each of the plurality of light blocking portions in a direction along the center line is positioned at an edge of one of the concave portions, and another end portion of the each of the plurality of light blocking portions is in contact with the second member.

8. The louver according to claim 7, wherein the first distance is equal to or larger than 5 μm and equal to or smaller than 50 μm.

9. The louver according to claim 7, wherein L1/L5 is equal to or larger than 1 and equal to or smaller than 2, where L1 is a length of each of the plurality of light blocking portions along the center line, and L5 is a distance by which adjacent light blocking portions of the plurality of light blocking portions are separated from each other in a direction orthogonal to the center line.

10. The louver according to claim 7, wherein the first length is equal to or larger than 5% of L1 and equal to or smaller than 20% of L1, where L1 is a length of each of the plurality of light blocking portions along the center line.

11. A head mounted display comprising:
a display panel;
a condensing optical portion configured to condense display light emitted from the display panel; and
the louver according to claim 7,
wherein the louver is disposed in an optical-path space in which an optical path of the display light that travels from the condensing optical portion toward a user's eye is formed.

12. An optical apparatus comprising:
a housing; and
the louver according to claim 7 and disposed in the housing.

13. A louver comprising:
a first member made of transparent material;
a second member made of transparent material; and
a plurality of light blocking portions made of light blocking material,
wherein the first member and the second member are configured to join with each other, with the plurality of light blocking portions being interposed between the first member and the second member,
wherein the first member includes concave portions, each of the concave portions being configured to be retracted toward a direction parallel to a center line of the louver,
wherein a first main surface of each of the plurality of light blocking portions is in contact with the first member, one portion of a second main surface of the each of the plurality of light blocking portions is in contact with the first member, and another portion of the second main surface is in contact with the second member, and wherein one end portion of each of the plurality of light blocking portions in a direction along the center line is in contact with one of the concave portions by a first length along the center line, and another end portion of the each of the plurality of light blocking portions is in contact with the second member.

14. The louver according to claim 13, wherein L1/L5 is equal to or larger than 1 and equal to or smaller than 2, where L1 is a length of each of the plurality of light blocking portions along the center line, and L5 is a distance by which adjacent light blocking portions of the plurality of light blocking portions are separated from each other in a direction orthogonal to the center line.

15. The louver according to claim 13, wherein the first length is equal to or larger than 5% of L1 and equal to or smaller than 20% of L1, where L1 is a length of each of the plurality of light blocking portions along the center line.

16. The louver according to claim 13, wherein a value obtained by dividing the first length by w is equal to or larger than 1 and equal to or smaller than 2, where w is a width of a cross section of each of the concave portions retracted toward a direction parallel to the center line of the louver.

17. A head mounted display comprising:
a display panel;
a condensing optical portion configured to condense display light emitted from the display panel; and
the louver according to claim 13,
wherein the louver is disposed in an optical-path space in which an optical path of the display light that travels from the condensing optical portion toward a user's eye is formed.

18. An optical apparatus comprising:
a housing; and
the louver according to claim 13 and disposed in the housing.

* * * * *